(12) United States Patent
Davis

(10) Patent No.: US 12,629,724 B1
(45) Date of Patent: May 19, 2026

(54) DEVICE TO SELECTIVELY SORT FLEXIBLE OBJECTS FROM A MIXED SOLID WASTE STREAM

(71) Applicant: CP Manufacturing, Inc., San Diego, CA (US)

(72) Inventor: Nicholas Davis, San Diego, CA (US)

(73) Assignee: CP Manufacturing, Inc., San Diego, CA (US)

( * ) Notice: Subject to any disclaimer, the term of this patent is extended or adjusted under 35 U.S.C. 154(b) by 0 days.

(21) Appl. No.: 19/008,518

(22) Filed: Jan. 29, 2025

(51) Int. Cl.
B07C 5/36 (2006.01)
B25J 15/06 (2006.01)

(52) U.S. Cl.
CPC ........... B07C 5/365 (2013.01); B25J 15/0616 (2013.01); *B07C 2501/0054* (2013.01); *B07C 2501/0063* (2013.01)

(58) Field of Classification Search
CPC ............ B07C 5/365; B07C 2501/0054; B07C 2501/0063; B25J 15/0616
See application file for complete search history.

(56) References Cited

U.S. PATENT DOCUMENTS

| | | | | |
|---|---|---|---|---|
| 12,064,792 | B2 * | 8/2024 | Holopainen | ............ B07C 5/065 |
| 12,485,556 | B1 * | 12/2025 | Doak | .................... B25J 15/0616 |
| 12,552,030 | B2 * | 2/2026 | Shaw | ..................... B25J 9/1612 |
| 2021/0046513 | A1 * | 2/2021 | McCoy, Jr. | .......... B25J 15/0616 |
| 2021/0155417 | A1 * | 5/2021 | Motowaki | ............. B65G 47/91 |
| 2021/0206586 | A1 * | 7/2021 | Douglas | ............... B65G 47/902 |
| 2023/0144252 | A1 * | 5/2023 | Lukka | ....................... B07C 5/36 |
| | | | | 414/752.1 |
| 2024/0009863 | A1 * | 1/2024 | Fitch | .................... B25J 15/0014 |
| 2024/0416389 | A1 * | 12/2024 | Wright | .................... B07C 5/342 |
| 2025/0121411 | A1 * | 4/2025 | Schlezinger | .......... B07B 13/003 |

* cited by examiner

*Primary Examiner* — Joseph C Rodriguez
(74) *Attorney, Agent, or Firm* — Manuel de la Cerra

(57) ABSTRACT

A system for sorting heterogeneous materials into homogeneous output is disclosed. The system comprises a conveyor, at least one sensor, an ejection means, a multi-axis arm for accurately positioning the ejection means (and optionally, rotating the ejection means), and a processor that controls the actuation of the multi-axis arm and the actuation of the ejection means based upon sensor input acquired when the stream of heterogenous materials passes into an inspection region located underneath the sensor on the conveyor surface.

9 Claims, 21 Drawing Sheets

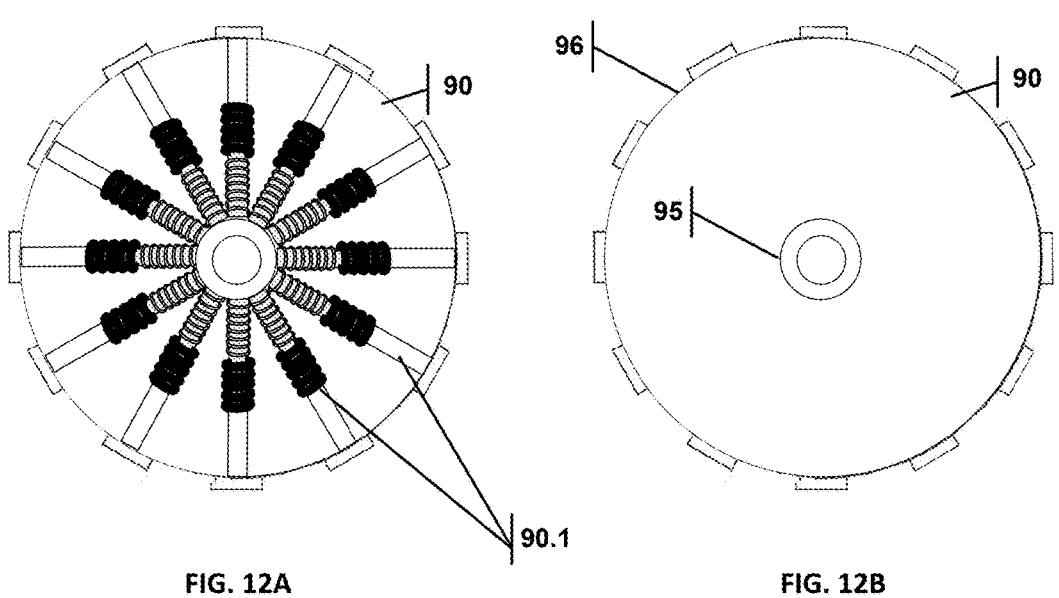
FIG. 12A                  FIG. 12B
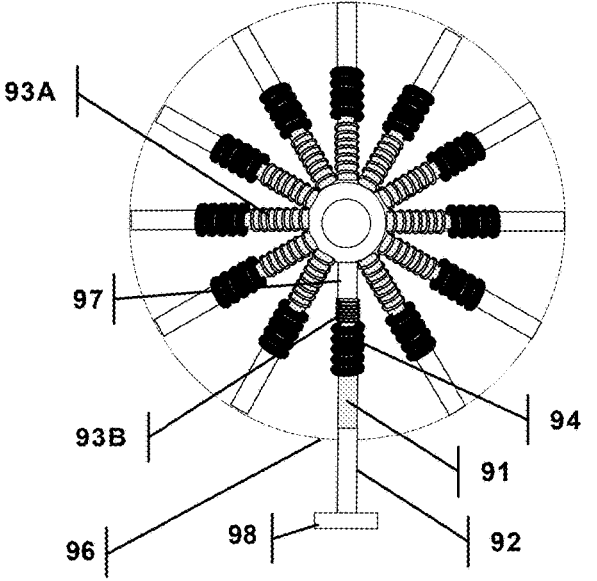
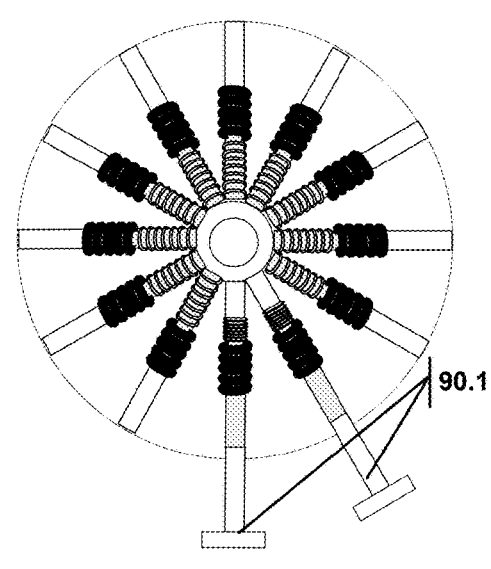
FIG. 12C                  FIG. 12D

DEVICE TO SELECTIVELY SORT FLEXIBLE OBJECTS FROM A MIXED SOLID WASTE STREAM

CROSS-REFERENCE TO RELATED APPLICATIONS

None

FIELD OF THE INVENTION

The present invention relates generally to machines used to sort materials and mixed recyclable materials.

BACKGROUND OF THE INVENTION

In a sort system designed to separate or sort a heterogeneous input into multiple homogeneous outputs, a variety of separating and sorting mechanisms may be used. One sorting method, called optical sorting, involves conveying objects via a conveyance method, sensing some attribute of the objects to be sorted via one or more sensors, classifying objects based on the sensed attributes, and then using an ejection method to eject the classified objects from the conveyance into sort bins, thereby creating at least two output streams that are homogeneous.

Conveyance and ejection methods may vary by the type of item needing to be sorted. For example, tomatoes are typically sorted by moving them on a high-speed belt conveyor and throwing them onto a predefined trajectory. Individually activated paddles will be placed in that trajectory, and bad tomatoes will be removed from the good tomato output by moving a paddle into the anticipated path. Both fractions of tomato then land in a water tank to prevent damage.

The most common form of ejection method, used across many industries, involves pushing an object to be sorted with compressed air while that object is in free fall or along a pre-established trajectory. Due to physical limitations, the objects to be sorted are pushed either up or down. Pushing sideways tends to cause collisions between items and is not usable in high-throughput applications.

All ejection methods mentioned above have taken place in a transition between conveyance means and receiving devices. This increases the capital cost of the sorting device installation, sometimes drastically. In high-throughput sorting applications, up to 2000 picks per minute, this can be amortized over a high number of picks, but in lower-throughput applications, the added capital cost can be prohibitive.

Other ejection methods have been explored that do not require a transition between conveyance and receiving. For example, pick-and-place robots equipped with suction cups can be used to lift a target item off the conveyance device and place the item in a target receiving area. This has several advantages and drawbacks. It has a lower cost than traditional optical sorting methods and has a larger number of potential outputs, increasing the utility for sorting larger number of long-tail items. However, sorting in this manner is typically limited to 60 picks per minute per robotic arm, and in practice the long-term rate averages about only 40 picks per minute. In addition, this method of sorting can have high failure rates when irregularly shaped objects are encountered. For example, when sorting scrap plastic items for recycling, the deformed and irregular plastic items can make sealing difficult, and these types of sorting systems typically have pick failure rates between 30% and 50%.

Various efforts have been made in prior art to reduce this failure rate such as U.S. Pat. No. 10,864,555B2 and US20240286296A1.

For more durable items needing sorting, such as scrap plastic, pick rates can be improved by ejecting or throwing the item to the target area rather than by placing it in the target area, such as in U.S. Pat. No. 11,465,858B2. This can increase the effective pick rate to up to approximately 80 picks per minute, but that still does not resolve the high pick-failure rate.

An older sorting method that avoids ejecting objects during transitions between conveyance and receiving uses compressed air to eject sideways across a conveyance device, such as a conveyor belt. This is often known derogatorily as a "belt sweeper", as it tends to have a high collateral rate of non-target items blocking the ejection path. The target object may also collide with small debris which may be on the conveyor. Ejecting the target all the way across a belt also requires a much larger volume of compressed air, which tends to increase collateral hit rate. This is especially prevalent on wide belts, as the dispersion rate of compressed air makes it difficult to target an item on the far side of a conveyor belt. This collateral rate results in low sort purity when positively sorting items and results in yield loss of target items when negatively sorting items in quality control processes. Yield loss through this method is considered more acceptable. This drawback of a belt sweeper can be avoided by placing all items in a single row so that no two items are blocking each other; however, this drastically limits throughput. This is sometimes used in smaller sort systems with a high number of outputs (such as sorting of recyclables in a rural community) by placing a high number of ejection devices downstream of a single sensor, where the items are made to travel in single-file.

U.S. Pat. No. 10,799,915B2 discloses a method to improve upon side ejection sorters based on having an array of ejection devices at different angles, and choosing which ejection device to use based on an optimal sort angle. This device still suffers from the same drawbacks as earlier, such as high volume of air used and a tendency to have multiple hits, although some obstructing objects may be avoided. It is trivial to see that not all blocking cases are avoided.

A better method of low-volume sorting is therefore needed.

SUMMARY OF THE INVENTION

A system for sorting heterogeneous materials is herein provided. The system comprises at least one conveyor, at least one sensor, a multi-axis arm, and a means of ejecting the object from the conveyor into a sort bin. The means of ejection may be pneumatic or mechanical.

In a first aspect, the sorting system comprises a processor that, based upon sensor input(s) to the processor, determines the location of a target material in the stream of mixed materials, calculates an unobstructed ejection path from the target material into a corresponding sort bin, and actuates the means for the target material or object to be ejected from the conveyor into the corresponding sort bin for the target material that is adjacent to the top surface of the conveyor.

In a second aspect, the sorting system may comprise an electro-mechanical valve pneumatically connected to a pressurized air source and to a plurality of nozzles as part of a nozzle assembly. The processor of the sorting system can, based on a calculated ejection path, control the multi-axis arm to position the nozzle assembly adjacent to the target material or object, then actuate the electro-mechanical valve to release pressurized air through the plurality of nozzles, which propels the target material along the ejection path.

In a third aspect, the sorting system may further comprise a suction nozzle pneumatically connected to a vacuum air source, and the processor may actuate the vacuum source to form a suction connection between the suction nozzle and the target material. The processor can then actuate the movement of the suction nozzle (and thus the target material) so that the target material is lifted from the conveyor and moved over to the sort bin. Then, the processor can de-actuate the vacuum source to release the suction connection, dropping the target material into the sort bin.

In a fourth aspect, the sorting system may determine whether pressurized air or suction is used upon the target material or object, based on whether an unobstructed ejection path can be calculated. The processor may be programmed to prefer using a suction connection to move the target material into the sort bin when an unobstructed ejection path cannot be calculated.

In another aspect, the system may comprise a mechanical striker assembly at the tool end of the multi-axis arm. The processor can actuate the multi-axis arm to move to a position on the conveyor, then the processor can actuate the mechanical striker assembly to move one or more mechanical strikers to strike at the target material so that the target material moves along an ejection path calculated by the processor based on sensor input(s). The mechanical strikers are each controlled by a linear actuator, such as a solenoid, and these linear actuators are in turn controlled by the processor.

In another aspect, the ejection means located at the tool end of a multi-axis arm, whether pneumatic or mechanical, can be rotatable to fine-tune the ejection of the target material along the ejection path.

In other aspects, the sorting system may have the processor vary the force and/or the striking distance of each mechanical striker it controls, so that the momentum imparted to the target material via the mechanical striker may be controlled more precisely. The processor may further actuate a plurality of linear actuators to act independently upon a plurality of mechanical strikers, such that the target material is moved along the ejection path into the sort bin.

In yet another aspect, the processor can determine the force and/or the striking distance needed for each striker it actuates based upon one or more of: target material properties, expected target material size, and target material orientation or positioning.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

FIG. 11A is a side view of a mechanical striker component of the sorting system in its unactuated state.

FIG. 11B is a side view of a mechanical striker component of the sorting system, actuated via a linear actuator so that a portion extends out towards the target material.

FIG. 12A is a top cross-sectional view of a mechanical striker assembly, where all the strikers are in an unactuated state.

FIG. 12B is a top view of the mechanical striker assembly.

FIG. 12C is a top cross-sectional view of a mechanical striker assembly, where one mechanical striker has been actuated to extend out towards the target material.

FIG. 12D is a top cross-sectional view of a mechanical striker assembly, where two mechanical strikers have been actuated to extend out towards the target material.

DETAILED DESCRIPTION OF THE INVENTION

Figures 1A, 1B:
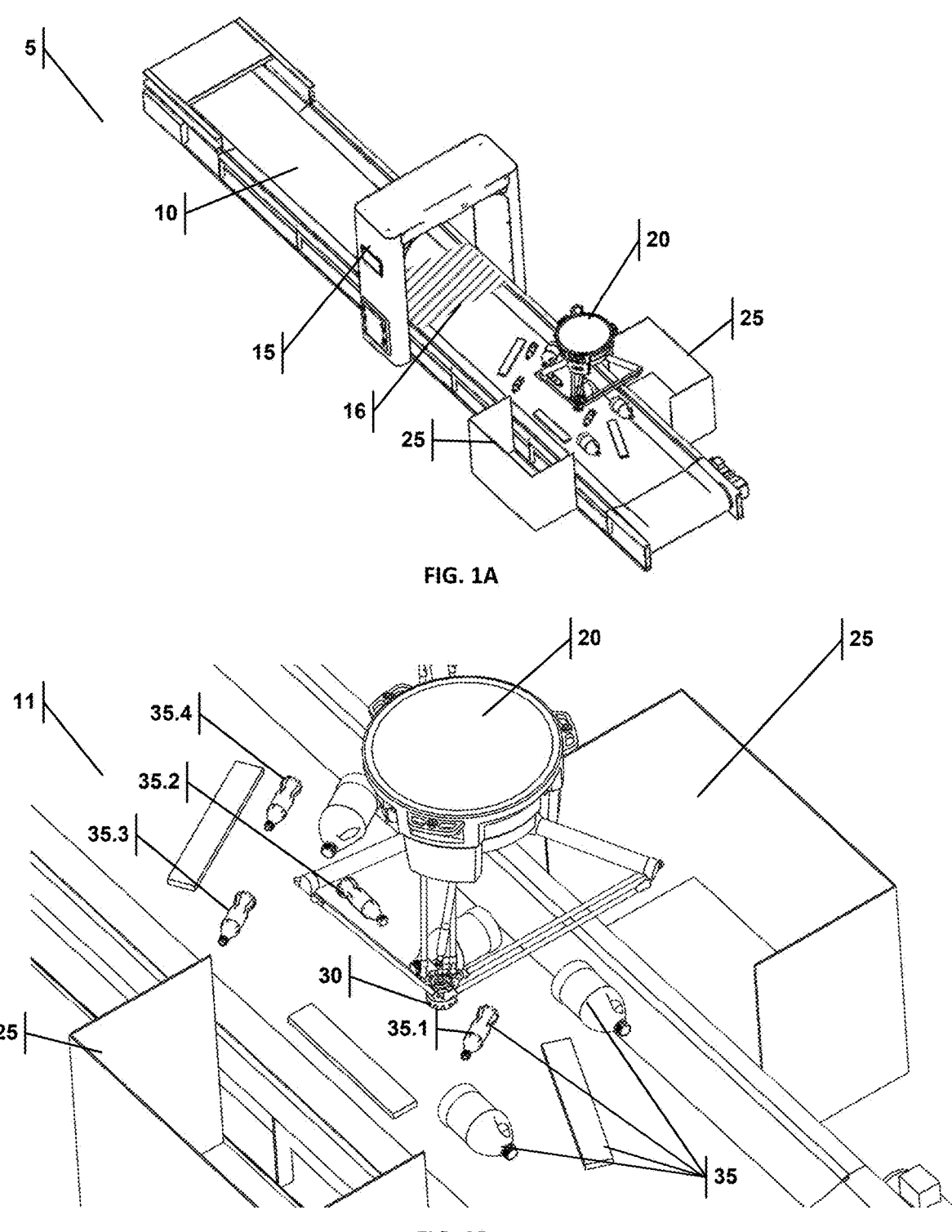
FIG. 1A is a top perspective view of a pneumatic sorter.
FIG. 1B is a top perspective view of a pneumatic sorter, detailing the multi-axis arm and nozzle assembly.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth to provide a thorough understanding of the present invention. Example embodiments of the present invention may be implemented without some or all these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms, unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

The following list of example features corresponds with the attached figures and is provided for ease of reference, where like reference numerals designate corresponding features throughout the specification and figures:

Sorter/Sorting System 5
Conveyor 10
Top Surface 11
Sensor 15
Inspection Region 16
Multi-Axis Arm 20
Tool End 22
Rotator 24
Rotation Direction 24.1
Sort Bins 25
Nozzle Assembly 30
Nozzle 30.1
Suction Nozzle 30.2
Biased Pressurized Air Stream 33
Mixed Material 35
Target Material 35.1, 35.2, 35.3, 35.4, 35.5
Ejection Path 40.1, 40.2, 40.3, 40.4, 40.5
Strike Direction 41, 41A, 41B
Strike Distance 42, 42A, 42B
Center of Mass on Target Object 50
Unintended Spin Direction 51
Manifold 55
Electro-mechanical Valve 60.1, 60.2, 60.N
Vacuum Source 62
Pressurized Air Source 63
Pressurized Air Line 65
Processor 70
Mechanical Strikers 90.1, 90.2, 90.3, 90.N
Mechanical Striker Assembly 90, 90A
Ferrous Portion 91
Non-ferrous Portion 92
Spring 93
Spring in Uncompressed State 93A
Spring in Compressed State 93B
Linear Actuator or Solenoid 94
Inner Surface 95
Outer Surface 96
Guide 97
Striking Surface 98

Figure 2:
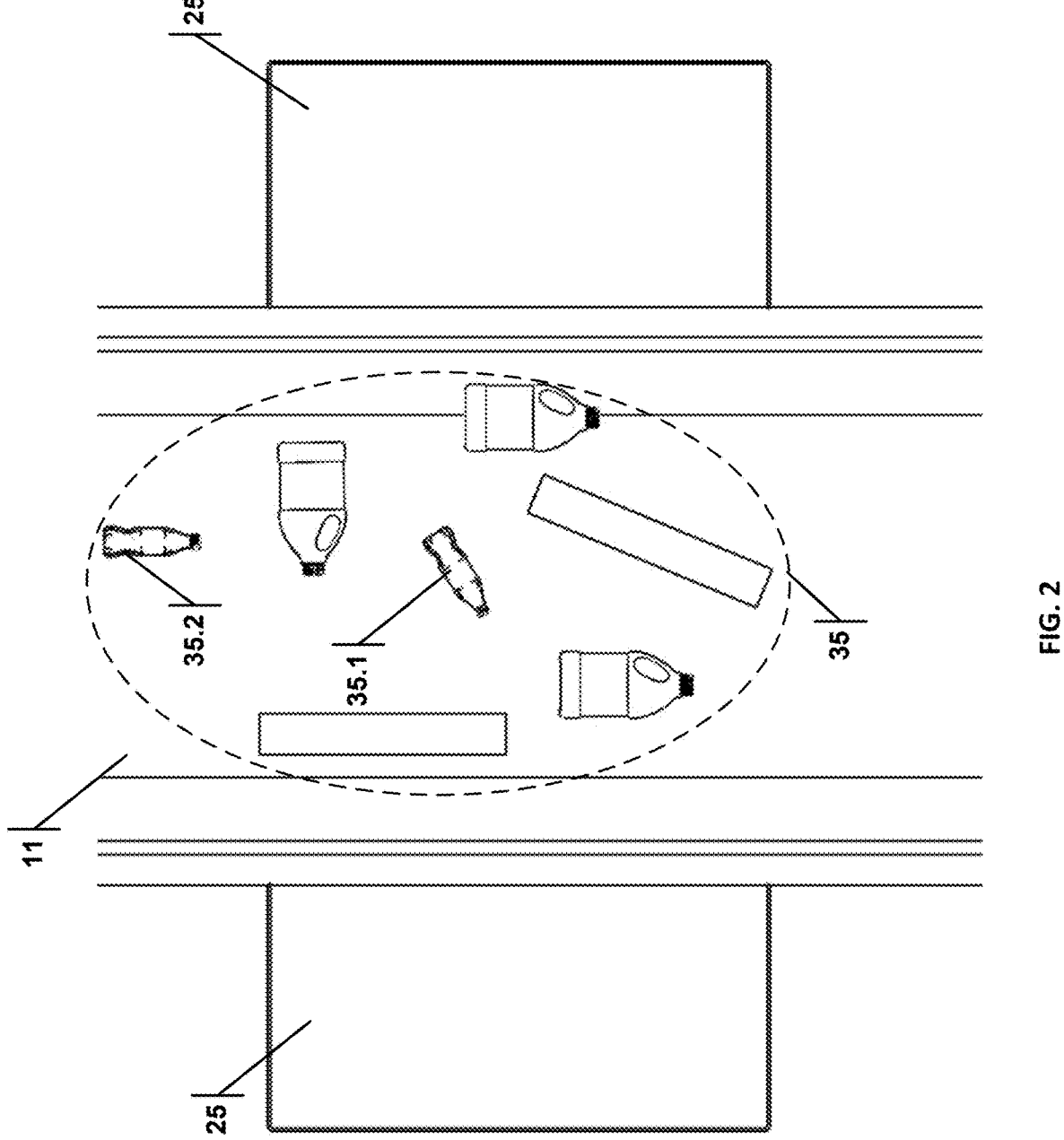
FIG. 2 is a top view of the mixed material on the conveyor, below the multi-axis arm.

Now turning to the figures, a system 5 for sorting a stream of mixed materials is shown in FIG. 1A, which illustrates a conveyor 10, a sensor 15, and an inspection region 16 on the conveyor 10 surface just beneath the sensor 15. The system 5 also comprises a multi-axis arm 20, and one or more sort bins 25 proximate to the conveyor 10 surface. In the enlarged top perspective view of FIG. 1B, more details of the conveyor top surface 11 can be seen, including the mixed material 35 and the target material objects 35.1, 35.2, 35.3, and 35.4. Also visible in FIG. 1B is a nozzle assembly 30. The conveyor 10 moves the mixed material 35 underneath the sensor 15 through the inspection region 16 towards the zone having the multi-axis arm 20 and the sort bins 25. The sensor 15 is positioned to detect and to classify the mixture of materials 35 based on physical or material properties. The sensor 15 may consist of one or more of: a NIR (near infrared) spectrometer, an optical camera, and a profiling sensor to detect obstructions on the belt, as non-limiting examples. A processor 70 of the sorting system 5 can then take the input from the sensor 15 as the mixed materials 35 pass the inspection region 16, and classify the mixed materials 35 based on chemistry, physical attributes, or other means, generally classifying the items into one or more target materials and one or more non-target materials. A neural network classifier may be used by the processor 70. The processor 70 may additionally use position information from the sensor 15 to construct a physical map of the objects, including target materials and non-target materials. This happens continuously as the conveyor 10 moves new material into the inspection region 16. Slower speeds of the conveyor 10 will reduce throughput, while at higher speeds, the materials may shift between the inspection region 16 underneath the sensor 15 and the sorting zone underneath the multi-axis arm 20. FIG. 2 indicates the mixed materials 35 traveling laterally on the conveyor top surface 11 directly underneath the multi-axis arm 20, which is located in between the sort bins 25 that are positioned on either side of the conveyor 10. The multi-axis arm 20 is adjacent to the conveyor 10 (above it) and located downstream from the sensor 15 and comprises a tool end 22 that can move over the top surface 11.

In the sorting system 5 of the present invention, the multi-axis arm 20 enables accurate positioning of the means to eject the target material from the conveyor 10 into sort bins 25. The means for ejecting the target material can be either pneumatic or mechanical, and the pneumatic embodiments will be discussed first in conjunction with FIGS. 3A-10B. Then, alternative embodiments using a mechanical means for ejecting the target material from the conveyor 10 will be discussed in conjunction with FIGS. 11-15.

After the stream of mixed materials 35 moves past the inspection region 16 of FIG. 1A, the processor 70 has data from the sensor 15. The processor 70 can process the physical map of individual items in the materials stream to calculate possible ejection trajectories for the target items on the conveyor 10 while avoiding non-target items. A pneumatic sorter system 5 comprises a nozzle assembly 30 at the tool end 22 of the multi-axis arm 20, and the nozzle assembly comprises a plurality of nozzles 30.1 that, when actuated, emits pressurized air to propel the target material 35.1, 35.2, 35.3, 35.4 along the ejection trajectory into a sort bin 25 on the side of the conveyor 10. The multi-axis arm 20 provides the means for adjusting the positioning of the nozzle assembly 30 not only forward, backward, left and right compared to the conveyor top surface 11, but also ideally upward or downward in the vertical direction above the conveyor top surface 11, to avoid blocking materials on the conveyor top surface 11 as the nozzle assembly 30 is moved during travel to the target location. In particular, the nozzle assembly 30 can be placed between potentially blocking objects and the target object such that the calculated ejection trajectory from the target object to the sort bin 25 is clear of blocking objects. With the data from the sensor

15, the processor 70 can anticipate where the target material and blocking items will be conveyed to over time, such that the processor 70 can choose an optimized time at which and an optimized location from which to eject a target material. For example, if a target material has blocking items perpendicular to travel on both sides, the processor 70 can position the nozzle assembly 30 via the multi-axis arm 20 such that the nozzle assembly 30 is operated to eject the target material 30 degrees or more up or down the conveyance travel direction, avoiding collisions.

Figure 3A:
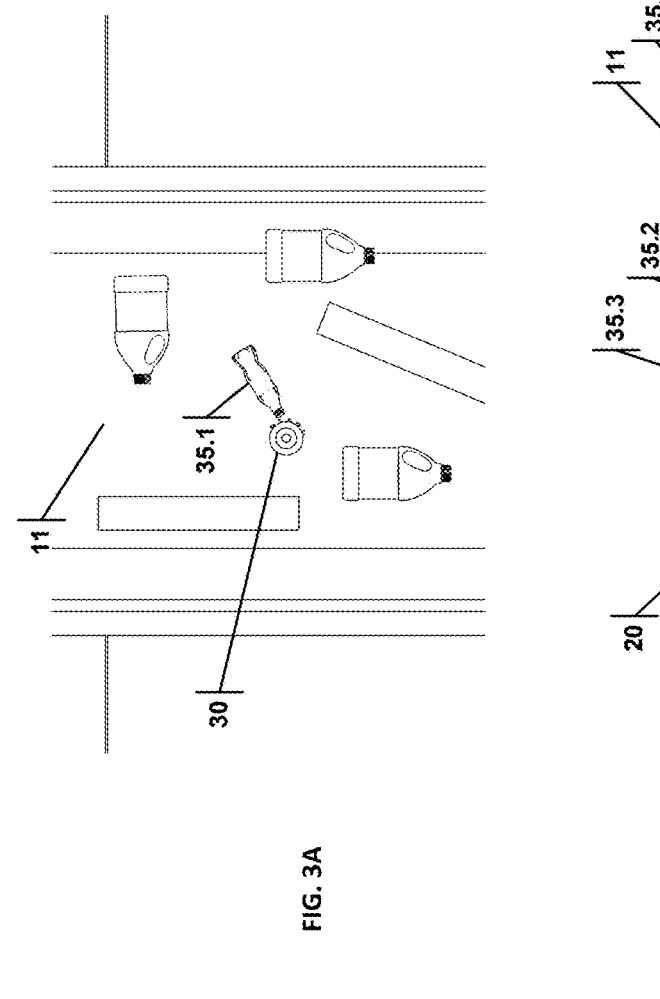
FIG. 3A is a top view of the mixed material on the conveyor, below the multi-axis arm, further showing the placement of the nozzle assembly adjacent to a first piece of target material.
Figure 3B:
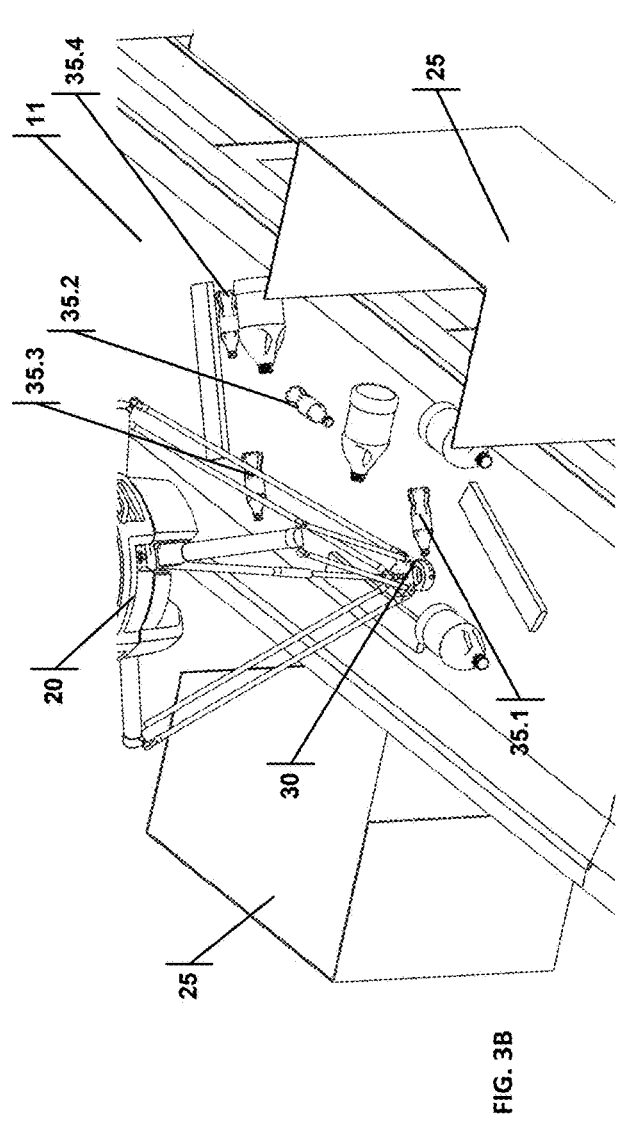
FIG. 3B is a top side perspective view of the pneumatic sorter, detailing the multi-axis arm and nozzle assembly adjacent to the first piece of target material.

FIGS. 3A and 3B present respectively a top view and a top perspective view of the placement of the nozzle assembly 30 adjacent to the first target material 35.1. Although the sorter system 5 only technically requires at least one sort bin 25, it is more ideal to have sort bins 25 placed on both sides of the conveyor 10. The reason for this is that having sort bins on both sides of the conveyor 10 increases the number of possible trajectories or ejection paths. In FIGS. 3A-3B, the nozzle assembly 30 is placed by the multi-axis arm 20 as closely as possible to the target material 35.1; this is preferred because this minimizes the volume of pressurized air required to impart the necessary force to propel the target material 35.1 into the sort bin 25.

Figures 3C, 3D:
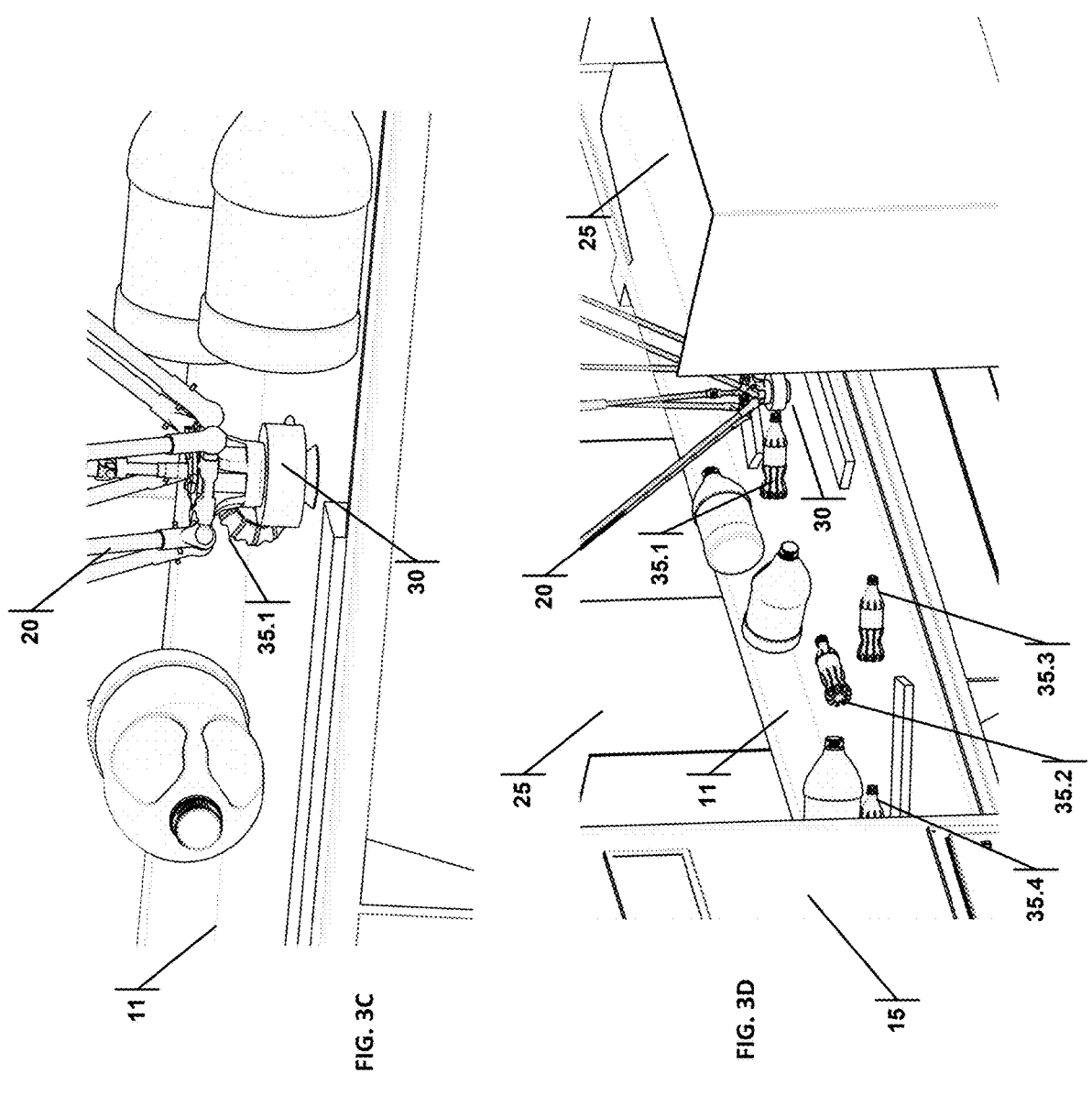
FIG. 3C is an enlarged side view of the pneumatic sorter, detailing the multi-axis arm and nozzle assembly adjacent to the first piece of target material.
FIG. 3D is an enlarged side perspective view of the pneumatic sorter, detailing the multi-axis arm and nozzle assembly adjacent to the first piece of target material.

FIG. 3C shows a side perspective view of the sorter system 5, which corresponds to a back perspective view of the nozzle assembly 30. In the nozzle assembly 30 depicted, the plurality of nozzles 30.1 face the target material 35.1 and are not visible. The plurality of nozzles 30.1 is turned to emit pressurized air to blow across the conveyor 10 top surface 11 because there is a rectangular object in the material stream that obstructs or blocks the path of the target material 35.1 into the sort bin 25 located closer to the positions of the nozzle assembly 30 and the target material 35.1. The obstructing or blocking object can be seen more clearly in FIG. 3D blocking between the nozzle assembly 30 and the sort bin 25. The plurality of nozzles 30.1 can be rotated with a rotator 24 connected to the nozzle assembly 30, which is more clearly shown and described with reference to FIG. 9.

Figures 3E, 3F:
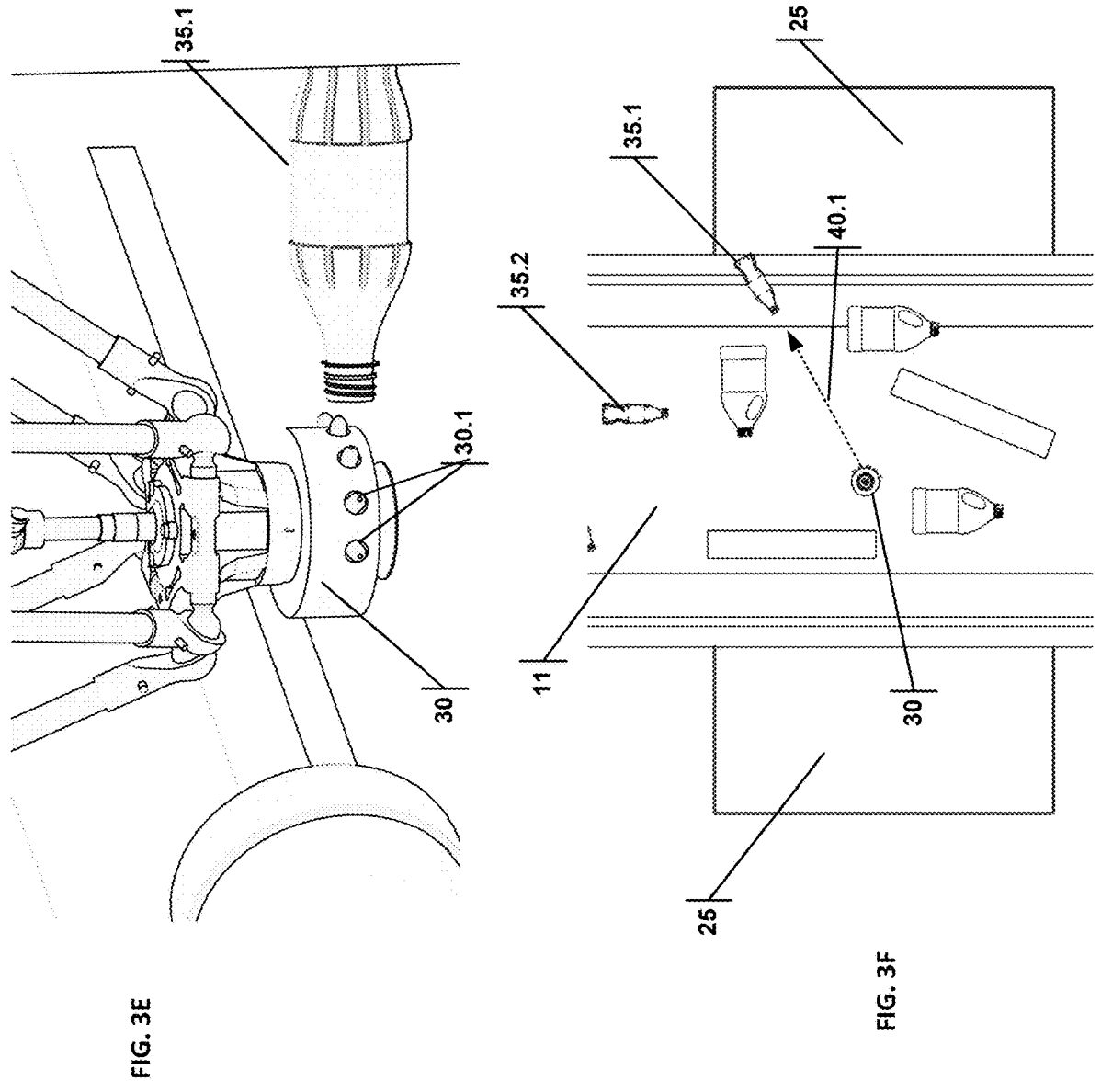
FIG. 3E is an enlarged side view of the multi-axis arm and nozzle assembly adjacent to the first piece of target material.
FIG. 3F is a top view of the mixed material on the conveyor, below the multi-axis arm, further showing the placement of the nozzle assembly and the ejection path of the first piece of target material to the sort bin.

FIG. 3E shows the side perspective view opposite the perspective view of FIG. 3C, showing the plurality of nozzles 30.1 very close to the target material 35.1. At this point, the processor 70 connected to an electro-mechanical valve pneumatically connected to a pressurized air source 63 and to the plurality of nozzles 30.1 has positioned the nozzle assembly 30 adjacent to the target material 35.1 based on an ejection path 40.1 that it has calculated. Now, the processor 70 actuates the electro-mechanical valve to release pressurized air to propel the target material 35.1 along the ejection path that the processor 70 has selected. In the top view of FIG. 3F, which takes place after the target material 35.1 has been propelled by the pressurized air from the plurality of nozzles 30.1, the ejection path 40.1 is shown relative to the positions of the other materials traveling along with the target material 35.1 along the conveyor top surface 11. The processor 70 of the sorter 5 has selected the ejection path 40.1 that has the target material traveling to the sort bin on the right-hand side of FIG. 3F because there is a larger unobstructed window with a larger allowance or tolerance for deviation along the ejection path 40.1 than that for any ejection path traveling to the left-hand side sort bin in FIG. 3F, based on the narrower distance in between different obstructing objects on the left-hand side of the nozzle assembly 30 and target material 35.1.

Figures 4A, 4B:
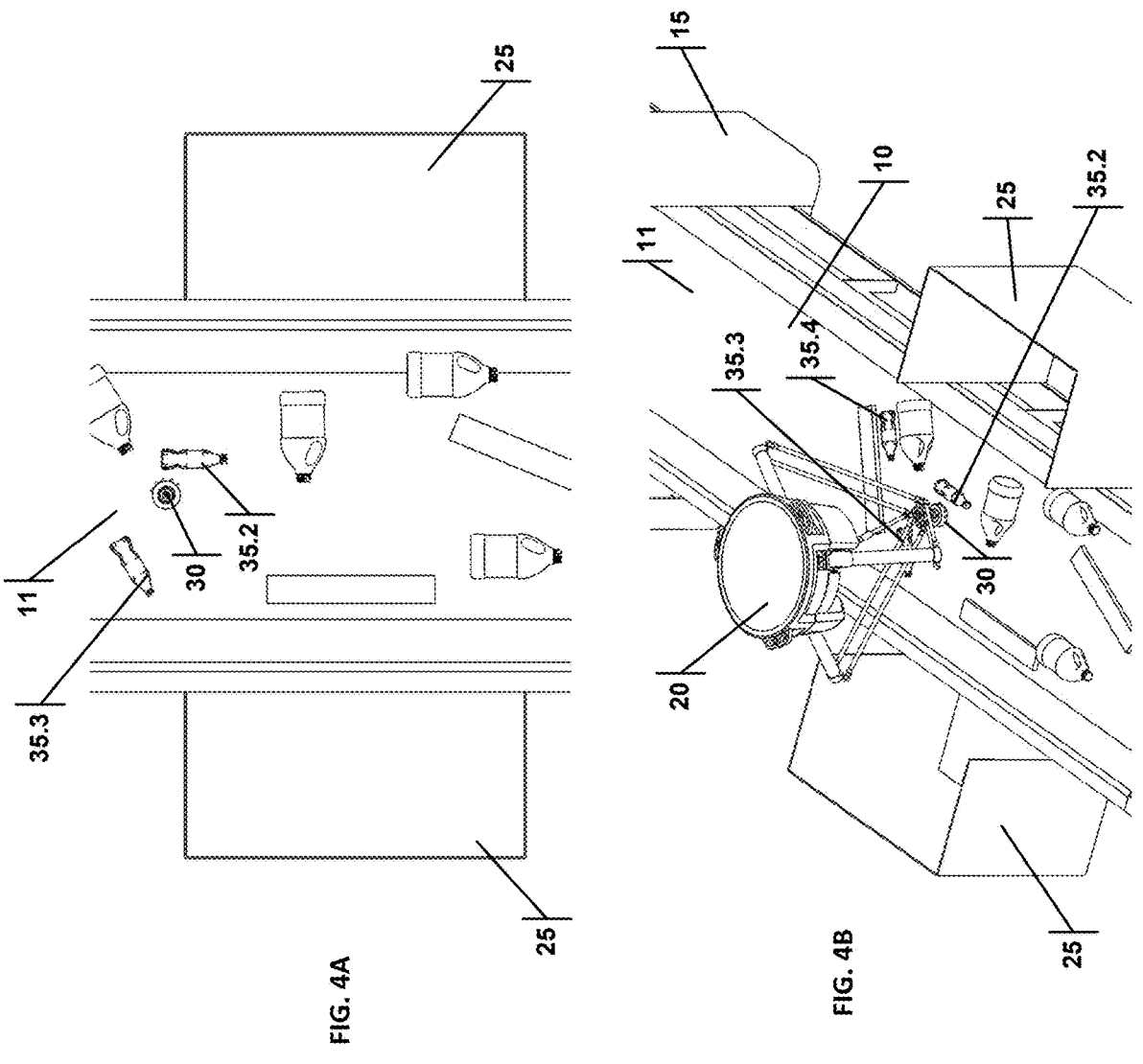
FIG. 4A is a top view of the mixed material on the conveyor, below the multi-axis arm, further showing the placement of the nozzle assembly adjacent to a second piece of target material.
FIG. 4B is a top side perspective view of the pneumatic sorter, detailing the multi-axis arm and nozzle assembly adjacent to the second piece of target material.

After the nozzle assembly propels target material 35.1 into a sort bin 25, it is moved to the next target material 35.2 to travel along the conveyor 10 top surface 11. FIG. 4A shows the top view of the position of the nozzle assembly 30 adjacent to the target material 35.2, and FIG. 4B shows the top perspective view of the same nozzle assembly 30 positioning. Then, FIG. 4C shows the ejection path 40.2 along which the target material 35.2 travels to the sort bin 25 after the plurality of nozzles 30.1 is activated to release pressurized air.

Figures 4C, 5A:
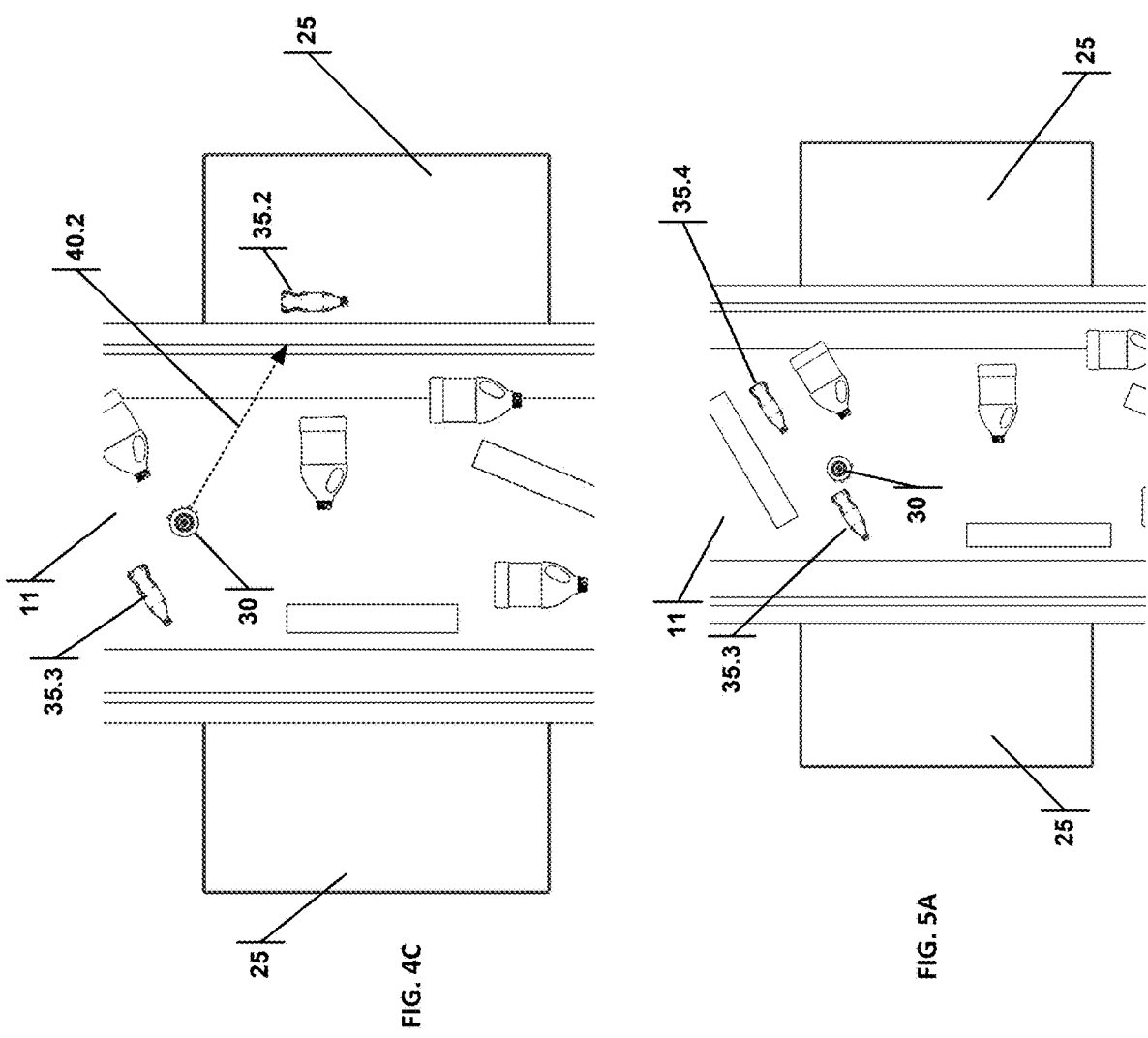
FIG. 4C is a top view of the mixed material on the conveyor, below the multi-axis arm, further showing the placement of the nozzle assembly and the ejection path of the second piece of target material to the sort bin.
FIG. 5A is a top view of the mixed material on the conveyor, below the multi-axis arm, further showing the placement of the nozzle assembly adjacent to a third piece of target material.
Figure 5B:
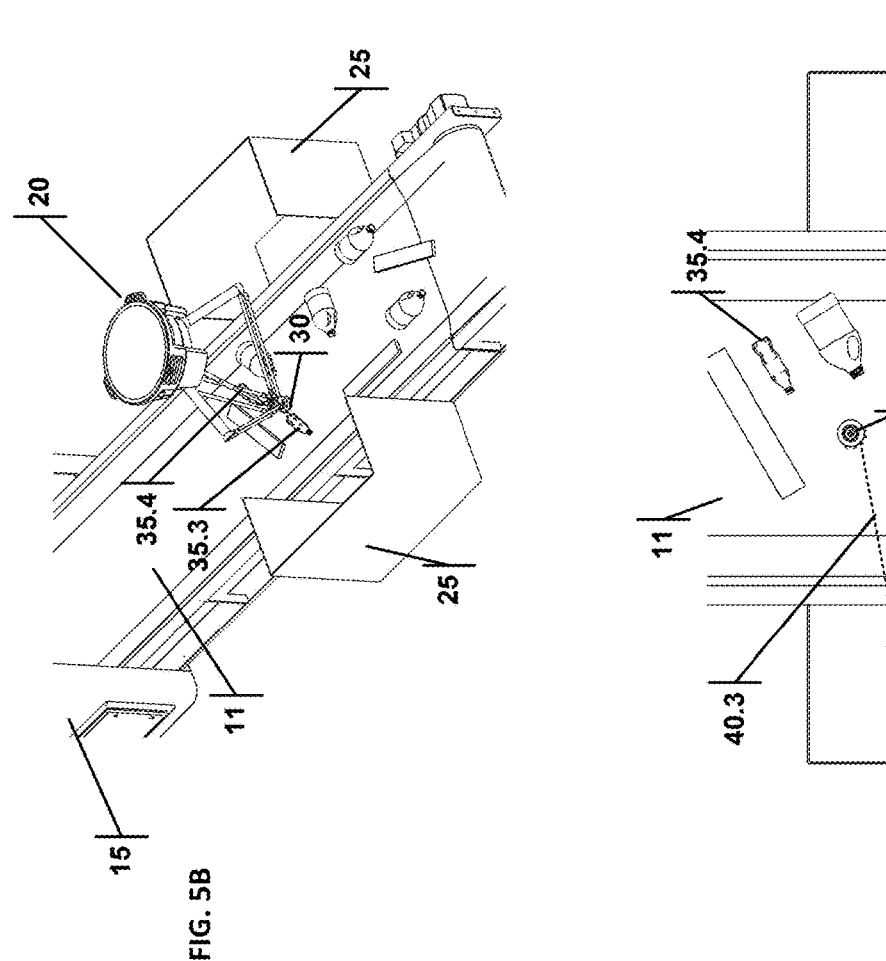
FIG. 5B is a top side perspective view of the pneumatic sorter, detailing the multi-axis arm and nozzle assembly adjacent to the third piece of target material.
Figure 5C:
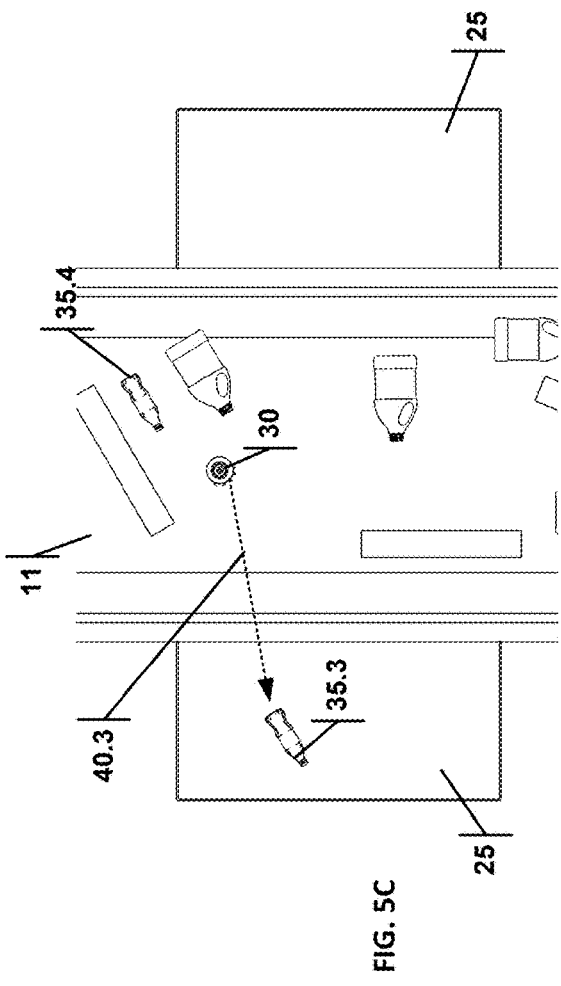
FIG. 5C is a top view of the mixed material on the conveyor, below the multi-axis arm, further showing the placement of the nozzle assembly and the ejection path of the third piece of target material to the sort bin.

Next, in FIG. 5A, the nozzle assembly 30 is moved more adjacent to the next target material 35.3, which can also be seen in the top perspective view of FIG. 5B. The processor 70 of the pneumatic sorter 5 then actuates the release of pressurized air via the plurality of nozzles 30.1, such that the target material 35.3 moves into the sort bin 25 along the ejection path 40.3.

Figure 6A:
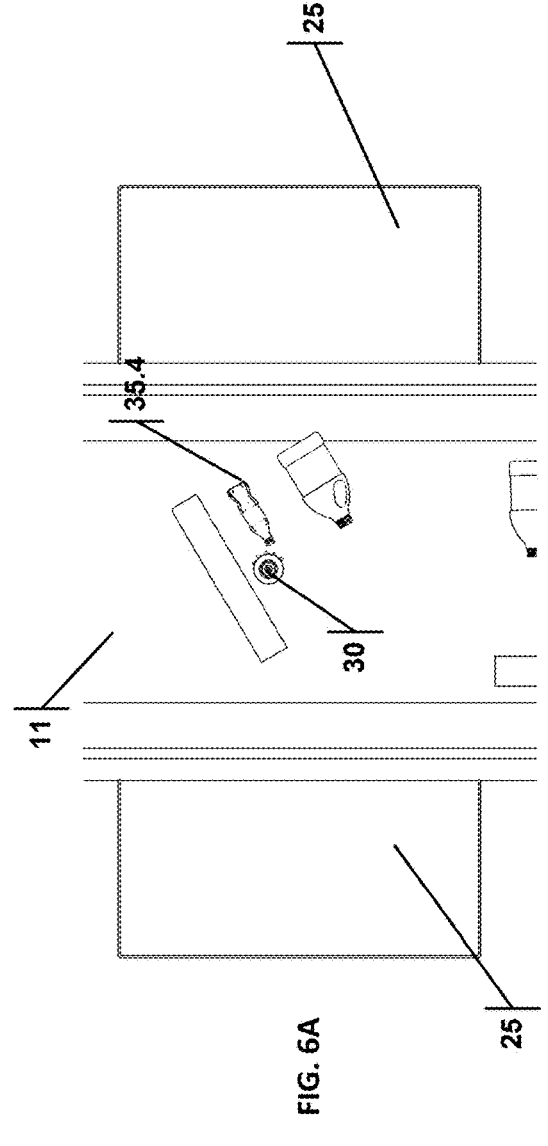
FIG. 6A is a top view of the mixed material on the conveyor, below the multi-axis arm, further showing the placement of the nozzle assembly adjacent to a fourth piece of target material.
Figure 6B:
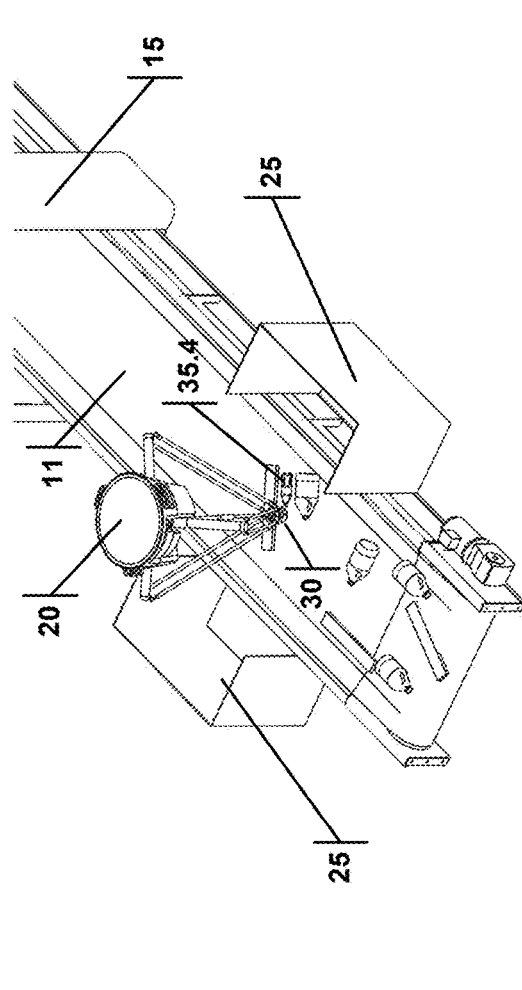
FIG. 6B is a top side perspective view of the pneumatic sorter, detailing the multi-axis arm and nozzle assembly adjacent to the fourth piece of target material.
Figure 6C:
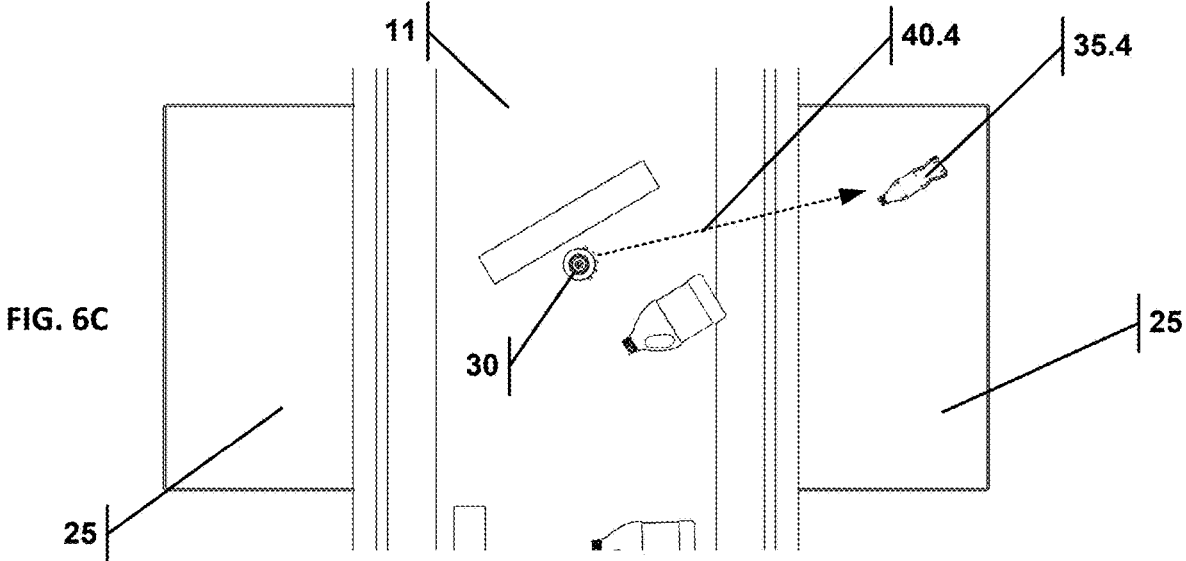
FIG. 6C is a top view of the mixed material on the conveyor, below the multi-axis arm, further showing the placement of the nozzle assembly and the ejection path of the fourth piece of target material to the sort bin.

Finally, the last target material 35.4 in the material stream is ejected in the same manner in FIGS. 6A-6C. The processor 70 determines the location of the target material 35.4, calculates the ejection path 40.4 from the target material 35.4 to the sort bin 25, positions the nozzle assembly 30 adjacent to the target material 35.4 based on the ejection path 40.4, and then actuates the electro-mechanical valve to release pressurized air to propel the target material 35.4 along the ejection path.

In practical operation, both target materials (35.1, 35.2, 35.3, 35.4) and non-target materials will be continuously conveyed to enter the sorting area. Based on the speed of the multi-axis arm movement, the processor 70 can calculate valid ejection paths (40.1, 40.2, 40.3, 40.4) for each target material as it travels through the inspection region 16. Based on the array of valid ejection paths for each target material, the processor 70 can choose an optimized pick order and ejection path within the sort area. This pick order and travel path can be optimized for maximum pick rate, minimum utility cost, minimum contamination, or some combination thereof. For example, in low-volume applications, utility cost and contamination can be minimized, whereas in high-volume applications, pick rate can be maximized. The optimization priority can be changed continuously based upon the number of materials/objects and target materials/objects in the area. As new materials enter the inspection region 16 and move toward the sorting area under the multi-axis arm 20, the optimized pick order and ejection paths can be continuously updated by the processor 70.

Depending on the application, as a non-limiting example, the conveyor 10 can move materials at a speed of between 250 feet per minute and 500 feet per minute, with 250 picks per minute achievable at high sorting efficiency.

Although FIGS. 1A-6C illustrate a sorting system 5 sorting just one type of target material, it does not depart from the spirit and scope of the present invention to operate the sorting system 5 for multiple types of target materials, with additional sorting zones and additional sort bins set up along different sections of the conveyor for other types of target materials. The same multi-axis arm 20 and nozzle assembly 30 may be used for multiple types or classes of target materials, or each type or class of target material may have its own dedicated multi-axis arm 20 and nozzle assembly 30, which would result in higher capital cost but has the potential to increase the throughput when sorting multiple materials at a high volume. It would also be apparent to one of skill in the art to have the processor 70 control the speed of the conveyor 10, to better manage the throughput and the pick rate and to minimize the pick failure rate.

Figures 7A, 7B, 7C:
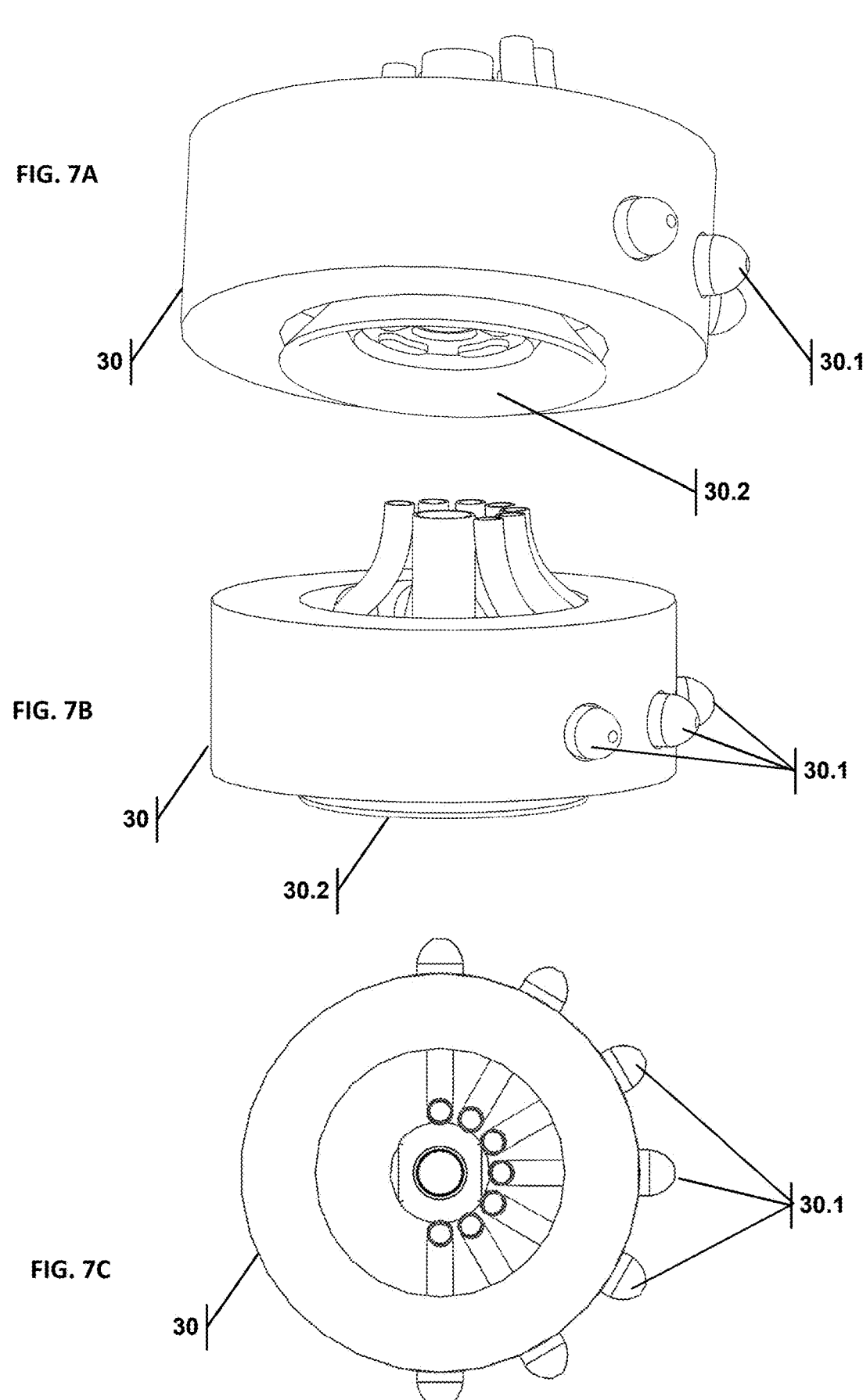
FIG. 7A is a bottom side perspective view of a nozzle assembly with nozzles along a 180-degree arc.
FIG. 7B is a side view of the nozzle assembly with nozzles along a 180-degree arc.
FIG. 7C is a top view of the nozzle assembly with nozzles along a 180-degree arc.

Turning now to FIGS. 7A-7C, the option of having a suction nozzle 30.2 is discussed. It is conceivable that, in some instances, for some streams of mixed materials, the processor 70 of the pneumatic sorter 5 may not calculate any valid ejection paths for a given target material. If there are no valid horizontal ejection paths between the target material and the sort bin, it would be advantageous to have a means of lifting a target material and place it into the sort bin, in a pick-and-place manner. A vacuum air source can share common components with a pressurized air source. However, as suction typically uses five times as much air as ejection per pick, the lateral ejection method using the plurality of nozzles 30.1 releasing pressurized air is preferred, both for its higher pick rate and lower utility cost.

In FIG. 7A, a bottom perspective view of the nozzle assembly 30 is presented, with the plurality of nozzles 30.1 protruding laterally from the nozzle assembly 30, and with the suction nozzle 30.2 located on the bottom of the nozzle assembly 30. FIG. 7B presents a side view of the same nozzle assembly 30 featuring both the plurality of nozzles 30.1 and the suction nozzle 30.2. Note that in both FIGS. 7A-7B, the suction nozzle 30.2 has a rather low profile to not impede the plurality of nozzles 30.1 when the preferred pick method of releasing pressurized air is used. FIG. 7C shows a top view of the nozzle assembly 30, where the plurality of nozzles spans a 180-degree arc along the circumference of the nozzle assembly. Also visible are the tubes connecting the plurality of nozzles 30.1 to the pressurized air source (not shown in FIGS. 7A-7C). It is obvious to one of skill in the art that the plurality of nozzles may span any greater or lesser arc, between 0 and 360 degrees, without departing from the scope and function of the present invention. A smaller arc would save on manufacturing cost, while a full 360-degree arc can cover a continuous range of ejection angles and maximize the number of ejection paths the system can calculate.

Figures 8A, 8B:
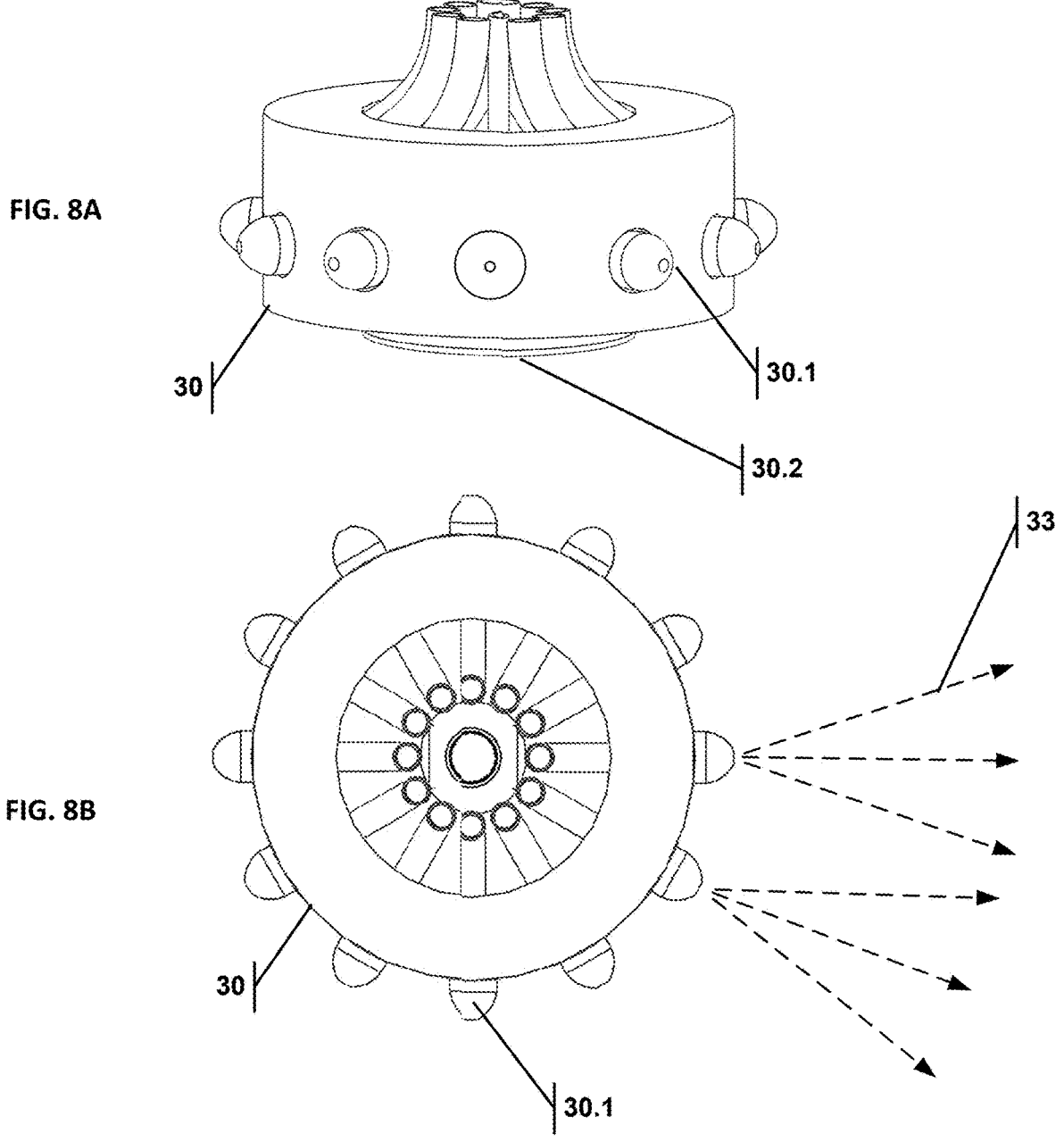
FIG. 8A is a side view of the nozzle assembly with nozzles along a 360-degree arc.
FIG. 8B is a top view of the nozzle assembly with nozzles along a 360-degree arc.

FIG. 8A depicts a side perspective view of a nozzle assembly 30 having nozzles 30.1 along a 360-degree arc. The suction nozzle 30.2 is visible in this view. FIG. 8B illustrates the same nozzle assembly 30 in a top view, and in FIG. 8B the biased pressurized air streams 33 are drawn. It should be noted that, in accordance with the length, shape or orientation of the target material, any number of nozzles 30.1 in the nozzle assembly 30 may be actuated to release pressurized air to propel the target.

Figure 9:
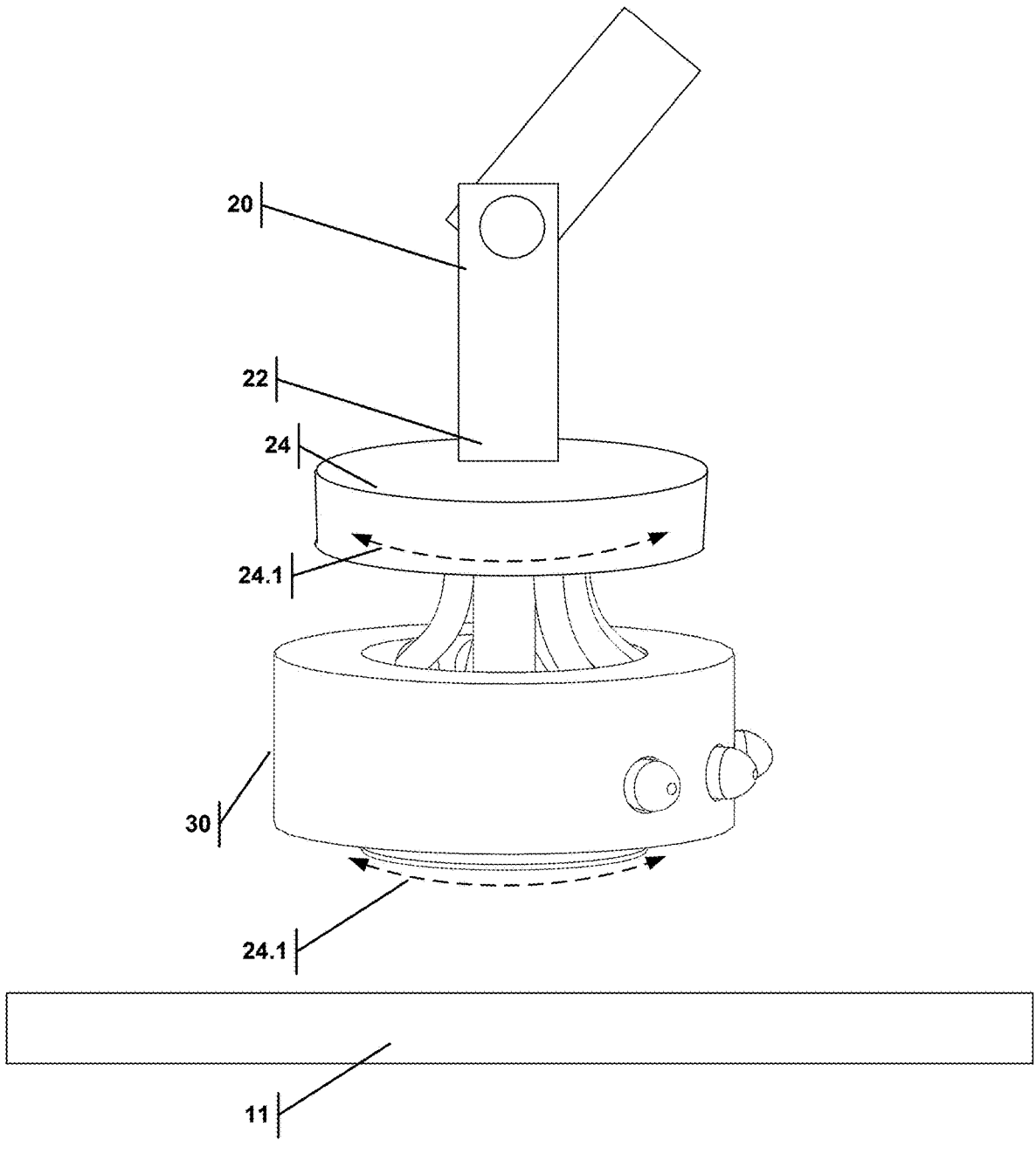
FIG. 9 illustrates a rotator on the tool end of the multi-axis arm to direct the pressurized air in a specific direction.

FIG. 9 illustrates that the nozzle assembly 30 may be connected to the tool end 22 of a multi-axis arm 20 via a rotator 24, which can be actuated to turn in a rotation direction 24.1. When the rotator 24 is actuated to rotate, the nozzle assembly 30, and by extension the direction of the plurality of nozzles 30.1 will also move along the rotation direction 24.1.

Figure 10A:
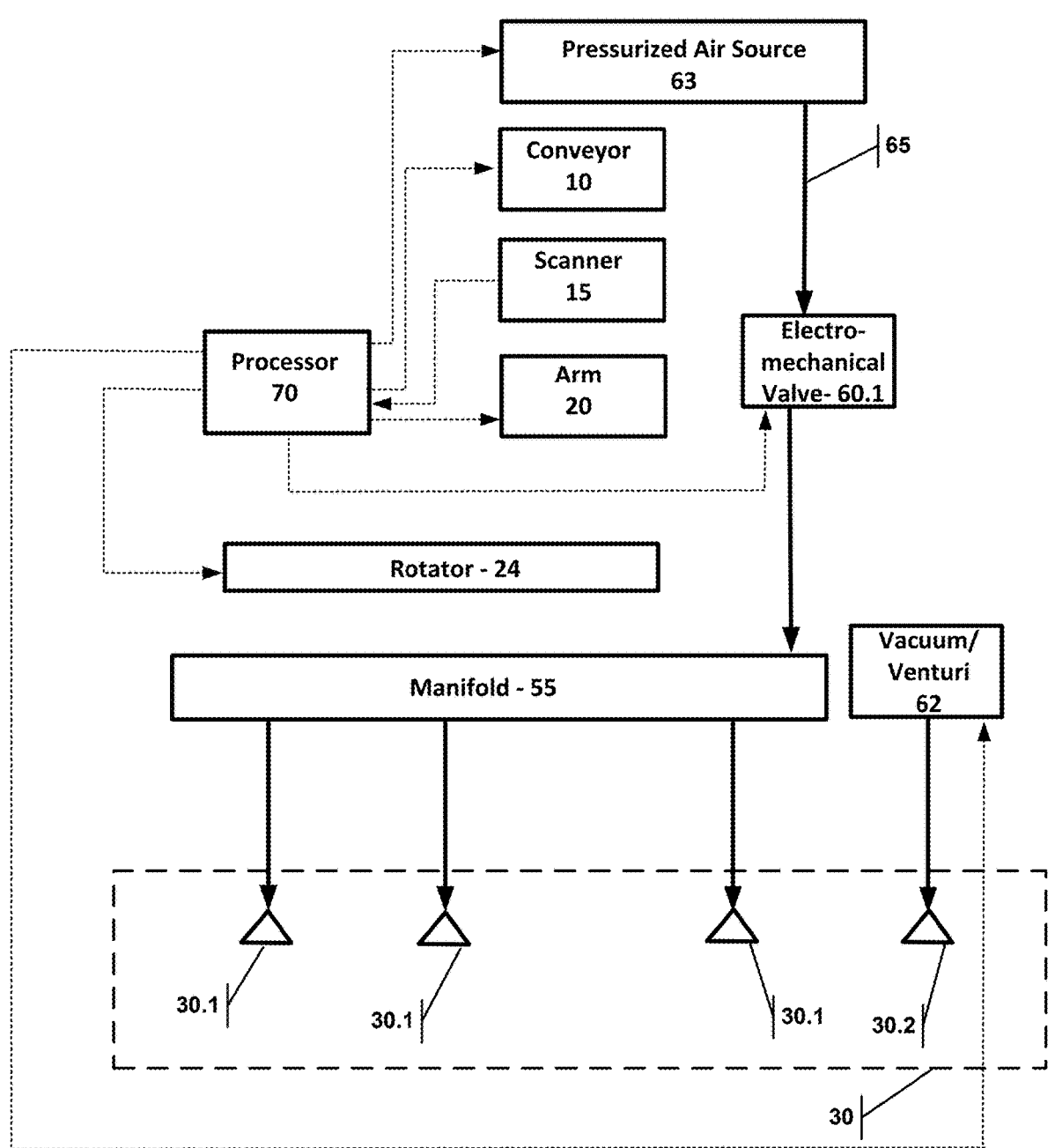
FIG. 10A is a schematic showing the various components of the pneumatic sorter.
Figure 10B:
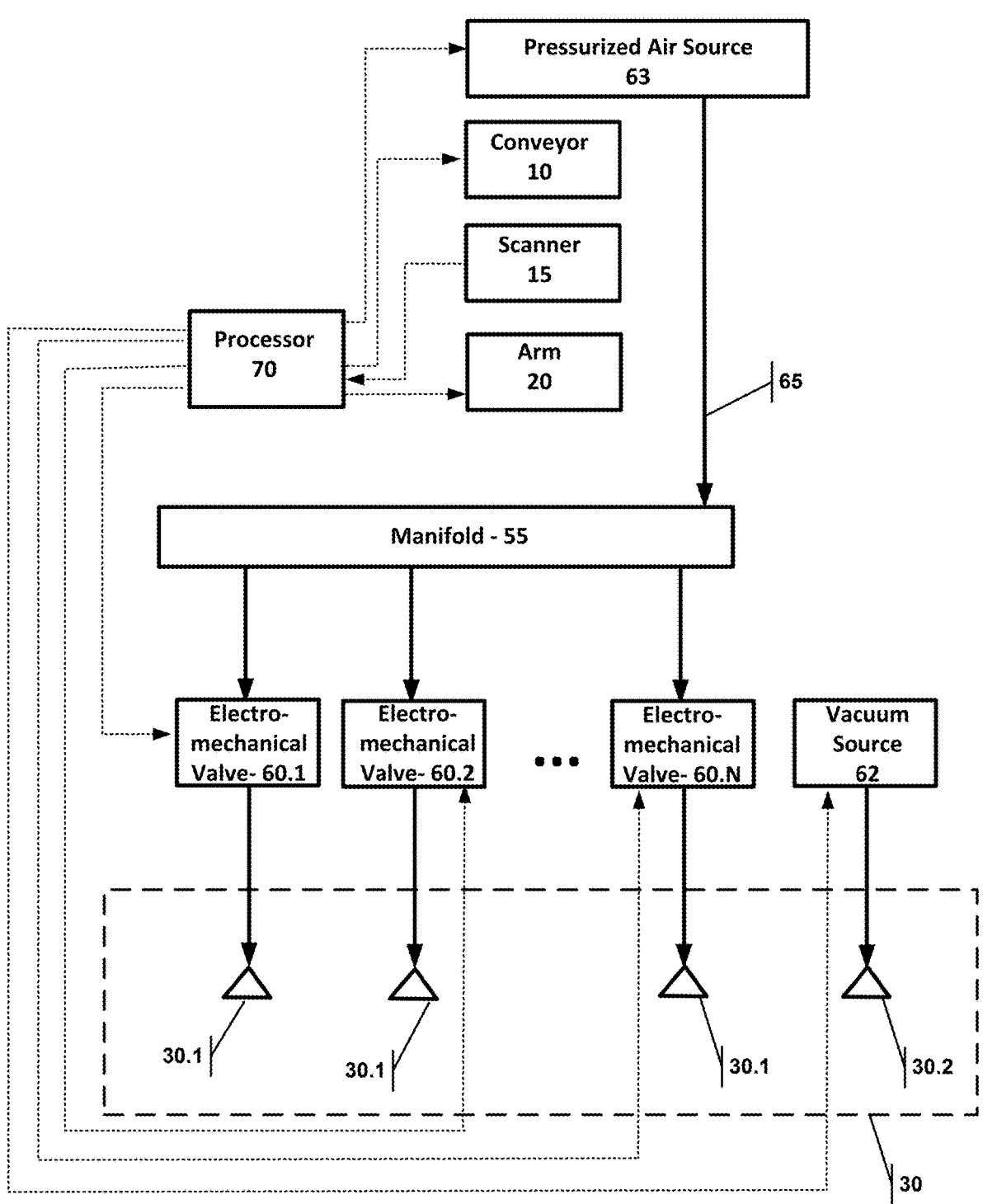
FIG. 10B is a schematic showing the various components of the pneumatic sorter.

FIGS. 10A and 10B show two different configurations for how the processor 70 can control the pneumatic sorter system 5. In FIG. 10A, the processor 70 receives input from the sensor 15, and sends outputs to the conveyor 10, the multi-axis arm 20, the rotator 24, the electro-mechanical valve 60.1, the vacuum source 62, and the pressurized air source 63. The pressurized air source 63 is connected by a pressurized electro-mechanical valve 60.1, which connects to a manifold 55 that distributes the pressurized air to the various nozzles 30.1. The suction nozzle 30.2 is in turn controlled by the vacuum source 62, based on the signal sent by the processor 70. In this first configuration, by controlling the single electro-mechanical valve 60.1, which controls the flow of the pressurized air from the pressurized air line 65 to the manifold 55 and therethrough to the plurality of nozzles 30.1, the processor 70 would actuate all the nozzles 30.1 to release pressurized air and de-actuate all nozzles 30.1 to cease the release of the pressurized air. This configuration is preferred when the plurality of nozzles 30.1 span a smaller arc along the circumference of the nozzle assembly 30, as releasing the pressurized air from all nozzles 30.1 along a larger arc would result in the unintended effect of propelling non-target materials, or at least shifting the positions of the non-target materials.

In the second configuration, shown in FIG. 10B, the processor likewise receives input from the sensor 15, and sends outputs to the conveyor 10, the multi-axis arm 20, the rotator 24, the vacuum source 62, and the pressurized air source 63. The pressurized air source 63 likewise provides pressurized air through a pressurized air line 65 to a manifold 55, and to the nozzles 30.1 through the manifold 55. What is different here is that instead of having a single electro-mechanical valve 60.1 control pressurized air flow to all the nozzles 30.1, there is a separate electro-mechanical valve 60.1 through 60.N for each nozzle 30.1 through 30.N. This means that the processor 70 can selectively control which nozzles 30.1 through 30.N will release the pressurized air. This second configuration is associated with a higher manufacturing cost, but the benefit will be higher selectivity in the direction of pressurized air release, higher pressure to impart force upon the target material, and minimal unintended shifting/movement of non-target materials. This second configuration of FIG. 10B would be preferred in combination with a nozzle assembly 30 where the plurality of nozzles 30.1 spans 360 degrees.

Putting it all together, the present invention provides a pneumatic sorter 5 for sorting a target material (35.1, 35.2, 35.3, 35.4) from a stream of mixed materials 35. The sorter 5 comprises a conveyor 10, a sensor 15, a sort bin 25, a multi-axis arm 20, a nozzle assembly 30, an electro-mechanical valve 60.1, and a processor 70. The conveyor 10 has a top surface 11 (FIG. 1B) for transporting the mixed material 35. The sensor 15 comprises an inspection region 16 (FIG. 1A) that includes a portion of the top surface 11. The sort bin 25 is adjacent to the top surface 11. The multi-axis arm 20 is located adjacent to the conveyor 10 and downstream from the sensor 15; the arm 20 additionally comprises a tool end 22 that can move over the conveyor top surface 11. The nozzle assembly 30 is located at the tool end 22 of the multi-axis arm 20, and the nozzle assembly 30 comprises a plurality of nozzles 30.1. The electro-mechanical valve 60.1 is pneumatically connected to a pressurized air source 63 and to the plurality of nozzles 30.1, and furthermore is constructed to turn on and off the pressurized air to the plurality of nozzles 30.1. The processor 70 is connected to the sensor 15, the multi-axis arm 20, and the electro-mechanical valve 60.1. The processor 70 is programmed to a) determine the location of the target material (35.1, 35.2, 35.3, 35.4); b) calculate an ejection path (40.1, 40.2, 40.3, 40.4) from the target material (35.1, 35.2, 35.3, 35.4) to the sort bin 25; c) position the nozzle assembly 30 adjacent to the target material (35.1, 35.2, 35.3, 35.4) based on the ejection path (40.1, 40.2, 40.3, 40.4); and d) actuate the electro-mechanical valve 60.1 to release pressurized air to propel the target material (35.1, 35.2, 35.3, 35.4) along the ejection path (40.1, 40.2, 40.3, 40.4). The pneumatic sorter 5 can have its sort bin 25 comprise at least two sort bins flanking the conveyor top surface 11 (FIGS. 1A-6C). The pneumatic sorter 5 can have its sensor 15 be comprised of a NIR sensor, a visual camera, a profiler or a combination thereof. In the pneumatic sorter 5, the conveyor 10 can be connected to the processor 70, and the processor 70 can control the speed of the conveyor 10.

Optionally, the pneumatic sorter 5 can also comprise a suction nozzle 30.2 (FIGS. 7A, 7B, 8A) in the nozzle assembly 30, and the suction nozzle 30.2 pneumatically connects to a vacuum air source 62. The processor 70 would then be connected to the vacuum source 62, and the processor 70 can also be programmed to: e) position the nozzle assembly 30 adjacent to the target material (35.1, 35.2, 35.3, 35.4); f) actuate the vacuum source 62 to form a suction connection between the suction nozzle 30.2 and the target material (35.1, 35.2, 35.3, 35.4); g) position the nozzle assembly 30 over the sort bin 25; and h) de-actuate the vacuum source 62 to release the suction connection, thereby dropping the target material (35.1, 35.2, 35.3, 35.4) into the sort bin 25 when the suction connection has been released. The vacuum source 62 may be a venturi powered by the pressurized air source 63. The steps (e) through (h) may be performed when the processor 70 cannot calculate an unobstructed ejection path (40.1, 40.2, 40.3, 40.4) from the target material (35.1, 35.2, 35.3, 35.4) to the sort bin 25 in step (b).

The pneumatic sorter 5 may further comprise a rotator 24 at the tool end 22 of the multi-axis arm 20 constructed to rotate the nozzle assembly 30, as shown in FIG. 9. The processor 70 is connected to the rotator 24, and the processor 70 would be further programmed to actuate the rotator 24 based on the ejection path (40.1, 40.2, 40.3, 40.4).

In an alternative configuration (FIG. 10B), the pneumatic sorter 5 may have the electro-mechanical valve 60.1 further comprise a plurality of electro-mechanical valves (60.1, 60.2, 60.N) pneumatically connected to the plurality of nozzles 30.1, and the processor would be connected to the plurality of electro-mechanical valves (60.1, 60.2, 60.N) and further be programmed to actuate one or more of the plurality of electro-mechanical valves (60.1, 60.2, 60.N) to form a biased (or directional) pressurized air stream based on the ejection path (40.1, 40.2, 40.3, 40.4) from step (b). As discussed earlier, this increases selectivity and minimizes movement of non-target materials.

A mechanical means of moving a target material across the conveyor 10 along an ejection path (40.1, 40.2, 40.3, 40.4) can be used in place of pressurized air. FIGS. 11A-15 present alternative mechanical embodiments wherein instead of a nozzle assembly 30 releasing pressurized air from a plurality of nozzles 30.1 to impart force upon a target, the sorting system uses a mechanical striker assembly 90 featuring a plurality of mechanical strikers (90.1 . . . 90.N) that physically strike the target material to impart momentum to propel it along an ejection path.

Figures 11A, 11B:
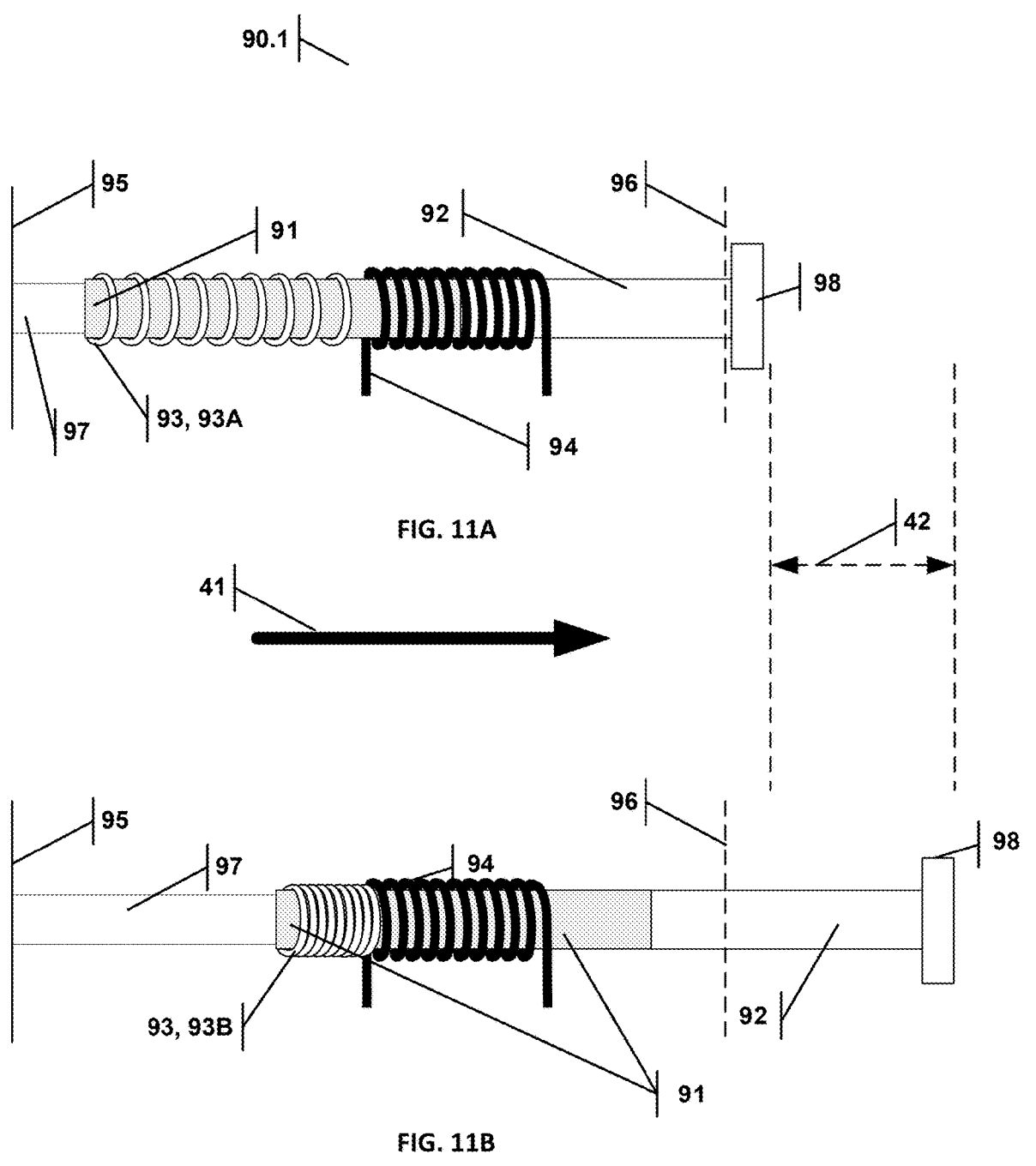

In FIG. 11A, an individual mechanical striker 90.1 is illustrated from a side view in its unactuated state. The mechanical striker 90.1 moves along a linear direction, and this linear movement is made possible by having a linear actuator or solenoid 94 act upon a ferrous portion 91 of the mechanical striker 90.1. While an electrical current passes through the linear actuator 94, the ferrous portion 91 is moved outward (right in the figure) toward the target material on the conveyor surface, and the mechanical striker 90.1 transitions from the position shown in FIG. 11A to that shown in FIG. 11B. In FIG. 11B, the mechanical striker 90.1 is in its actuated state, with a portion that extends out to physically strike the target material. The mechanical striker 90.1 comprises a ferrous portion 91, a non-ferrous portion 92 attached to the ferrous portion 91, a spring 93 fixed to one end of the ferrous portion 91, and a linear actuator 94 positioned adjacent to another end of the ferrous portion 91 near where the non-ferrous portion 92 attaches and opposite to the end where the spring 93 attaches. The linear actuator 94 actuates the movement of the ferrous portion 91, and when there is no current passing through the linear actuator 94, the spring 93 restores the position of the ferrous portion 91 to its unactuated position. In the unactuated state depicted in FIG. 11A, the spring 93 is in its uncompressed state 93A.

When the mechanical striker 90.1 is actuated, as in FIG. 11B, the spring 93 is in a compressed state 93B.

The non-ferrous portion 92 is attached to the ferrous portion 91, and it is the non-ferrous portion 92 that extends out to strike the target material. The non-ferrous portion 92 may optionally be removably attached to the ferrous portion 91, so as the non-ferrous (contact) portion 92 is worn down over time, it may be replaced to extend the life of the mechanical striker assembly 90.

It is well-known to one of skill in the art that varying the cross-section, the diameter, or length of the ferrous portion 91 and/or the cross-section, the diameter or length of the linear actuator 94 will alter the strength of the force. Varying the current passing through the linear actuator 94 also varies the force of each mechanical striker. Moreover, varying the length of time that current passes through the linear actuator 94 will vary the striking distance 42 (shown in FIG. 11B) of the mechanical striker 90.1. Thus, by controlling the magnitude of the current and the length of time of the current to the linear actuator 94, a processor 70 controlling the mechanical striker 90.1 may vary the force and/or the striking distance of the mechanical striker 90.1.

It would be desirable for the non-ferrous portion 92 to further comprise a striking surface 98 attached to the non-ferrous portion 92 opposite the end of the non-ferrous portion 92 that attaches to the ferrous portion 91. The striking surface 98 may be removably attached, and it would be preferable for the striking surface 98 to have a larger cross-sectional area than that of the non-ferrous portion 92 of the mechanical striker 90.1. This is to have a larger contact area when striking the target material in a mixed material stream. It would likewise be preferable for the striking surface 98 to be made of flexible material, so that the striking surface 98 can conform a bit to the shape of the target material, helping to distribute the force more evenly. It would further be preferred that the striking surface 98 can be removably attached to the non-ferrous portion 92, so that the striking surface 98 can be replaced as it wears over time.

FIGS. 11A and 11B also show an inner surface 95 and an outer surface 96, which respectively denote the inner and outer walls of the mechanical striker assembly 90 (see FIGS. 12A-12D) enclosing the mechanical striker 90.1. The striker assembly 90 may comprise a guide 97 extending from the inner surface 95 towards the outer surface 96, where the guide 97 attaches to an end of the ferrous portion 91 or attaches to the spring 93 attached to the ferrous portion 91. Having a guide 97 may help restrict the ferrous portion 91 and non-ferrous portion 92 to move in a substantially linear direction between the inner surface 95 and the outer surface 96 and minimize movement in other directions.

To achieve a more compact construction, the ferrous portion 91 of a mechanical striker 90.1 can be made hollow. The striker assembly 90 comprises an inner surface 95 and an outer surface 96 that enclose the mechanical striker 90.1. The guide 97 can extend from the inner surface 95 towards the outer surface 96, wherein the guide 97 is positioned inside the hollow of the ferrous portion 91 of a mechanical striker 90.1. Both the ferrous and non-ferrous portions (91, 92) of the mechanical striker 90.1 move linearly along the direction that the guide 97 extends. Alternatively, the non-ferrous portion 92 of the mechanical striker 90.1 can be made hollow. The guide 97 can alternatively extend from the outer surface 96 towards the inner surface 95. The guide 97 would then be positioned inside the hollow of the non-ferrous portion 92 so that both the ferrous and non-ferrous portions (91, 92) of the mechanical striker 90.1 move linearly along the direction that the guide 97 extends.

The mechanical striker assembly 90 is shown in a top cross-sectional view in FIG. 12A. The specific embodiment depicted has the positions of the mechanical strikers 90.1 arranged radially relative to the assembly inner surface 95. The striking surfaces 98 of the mechanical strikers 90.1 lie outside the outer surface 96. FIG. 12B depicts the top surface of the striker assembly 90. It would generally be desired to have the individual mechanical strikers 90.1 covered and isolated from unintended influences such as debris from the conveyor interfering with the operation of the individual mechanical strikers 90.1.

FIGS. 12C and 12D are cross-sectional views. FIG. 12C depicts one mechanical striker 90.1 in the assembly 90 actuated, whereas FIG. 12D depicts two mechanical strikers 90.1, 90.2 actuated. More on why a plurality of mechanical strikers may be activated will be discussed in conjunction with FIGS. 14B and 14C.

Figure 13:
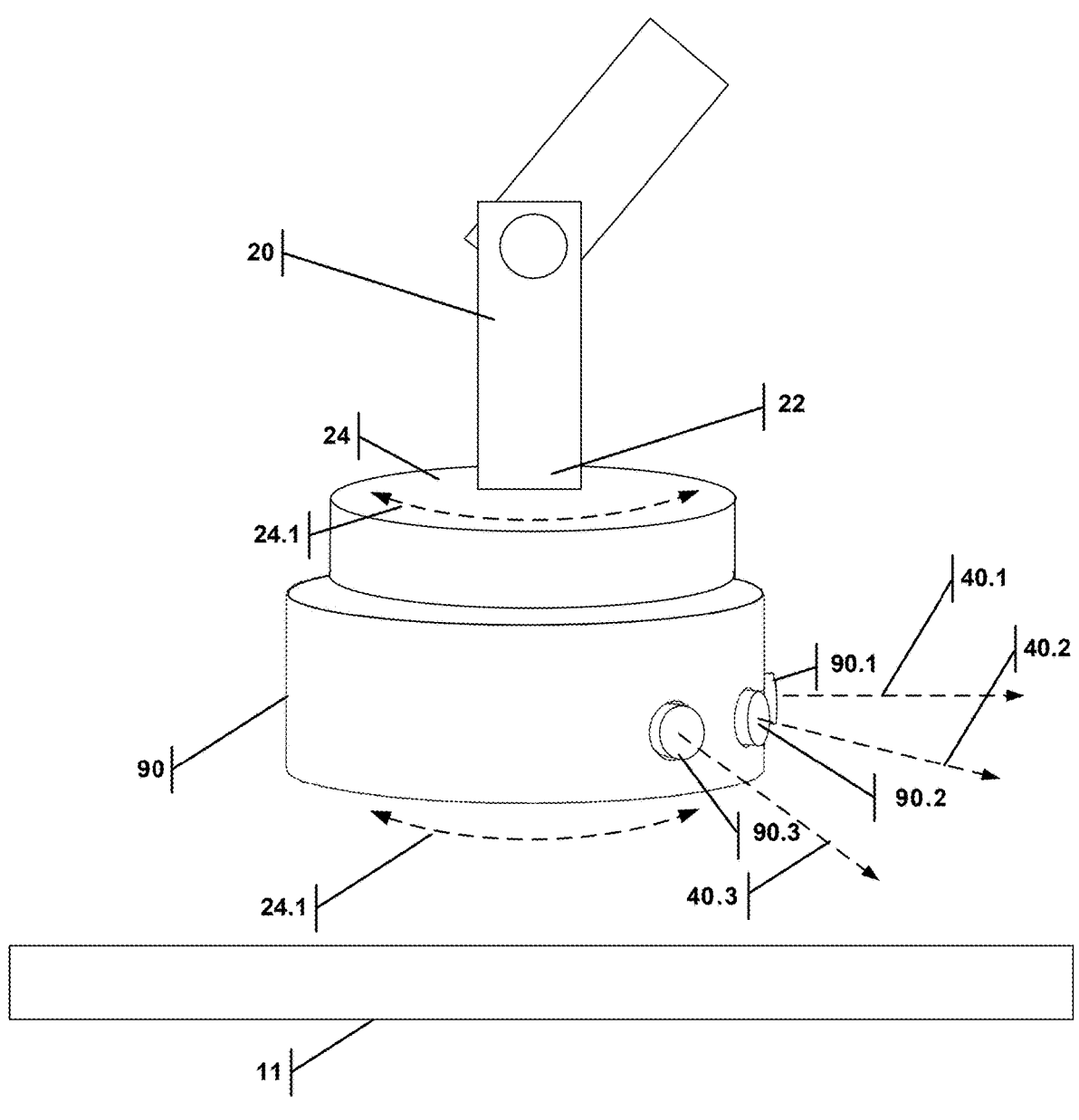
FIG. 13 illustrates a mechanical striker assembly at the tool end of a multi-axis arm with three mechanical strikers visible along an arc.

In FIG. 13, the mechanical strikers (90.1, 90.2, 90.3) are shown without the striking surfaces 98 for ease of illustration. Each mechanical striker in the assembly 90 can be actuated to its own corresponding ejection path (40.1, 40.2, 40.3). Moreover, as the mechanical strikers (90.1, 90.2, 90.3) are arranged radially within the assembly 90, the sorting system 5 may comprise a rotator 24 at the tool end 22 of the multi-axis arm 20 used to rotate the mechanical striker 90, and by extension the individual mechanical strikers (90.1, 90.2, 90.3) along the rotation direction 24.1, so that the maximum number of unobstructed ejection paths may be achieved from any given position of the striker assembly 90 on the conveyor 10 adjacent to target material.

Figures 14A, 14B:
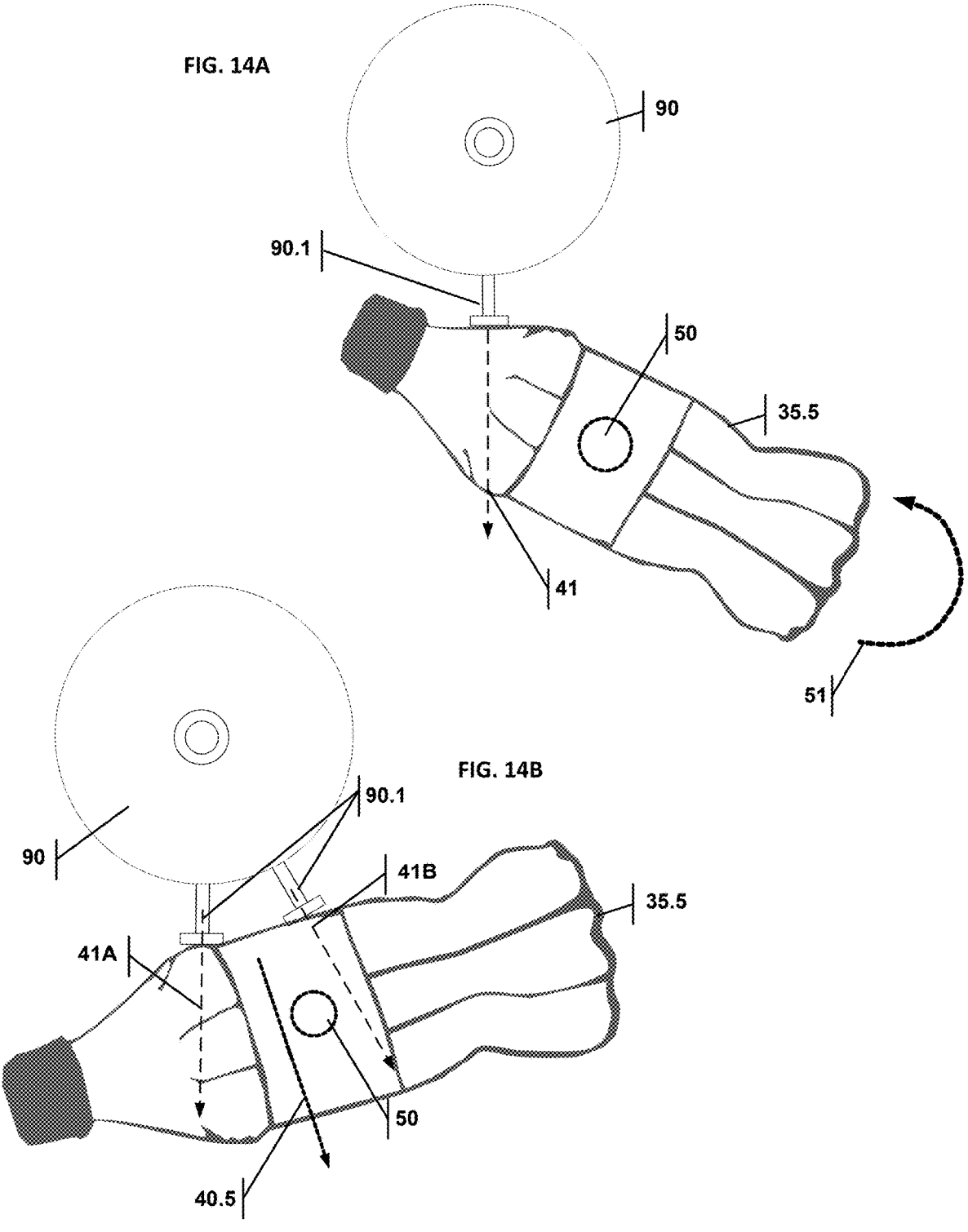
FIG. 14A illustrates a top view of one mechanical striker of the sorting system, in a radially arranged striker assembly, striking at the target object, causing spin.
FIG. 14B illustrates a top view of two mechanical strikers of the sorting system, in a radially arranged striker assembly, striking at the target object, resulting in the target object traveling in a linear manner.

With a sorter employing a pneumatic means of propelling the target material into the sort bin 25, the pressurized air released by the plurality of nozzles 30.1 distributes the force imparted against the target material relatively evenly and automatically. However, when imparting a force to a target material via physical contact, consideration needs to be given to the position of the physical strike relative to the material's center of mass. If a single mechanical striker 90.1 strikes the target material 35.5 at one end, i.e. at a significant distance away from its center of mass 50, then a torque may be generated that results in an unintended spin along the direction 51 shown in FIG. 14A, because the strike direction 41 is not near the target material's center of mass 50. While theoretically a precisely placed strike close to the target material's center of mass 50 can ensure no unintended spin 51, this can be difficult to achieve, especially if the target material 35.5 has shifted position after the inspection region 16 from which it was observed by the sensor 15. As such, it may be desirable for the processor 70 to actuate a plurality of linear actuators 94, which push out a plurality of mechanical strikers 90.1, as shown in FIGS. 12D and 14B, to have multiple points of contact with the target material 35.5. As illustrated in FIG. 14B, the sum of the independent torques along the strike directions 41A, 41B results in the net force pushing the target material 35.5 along a substantially linear ejection path direction 40.5.

Figures 14C, 14D:
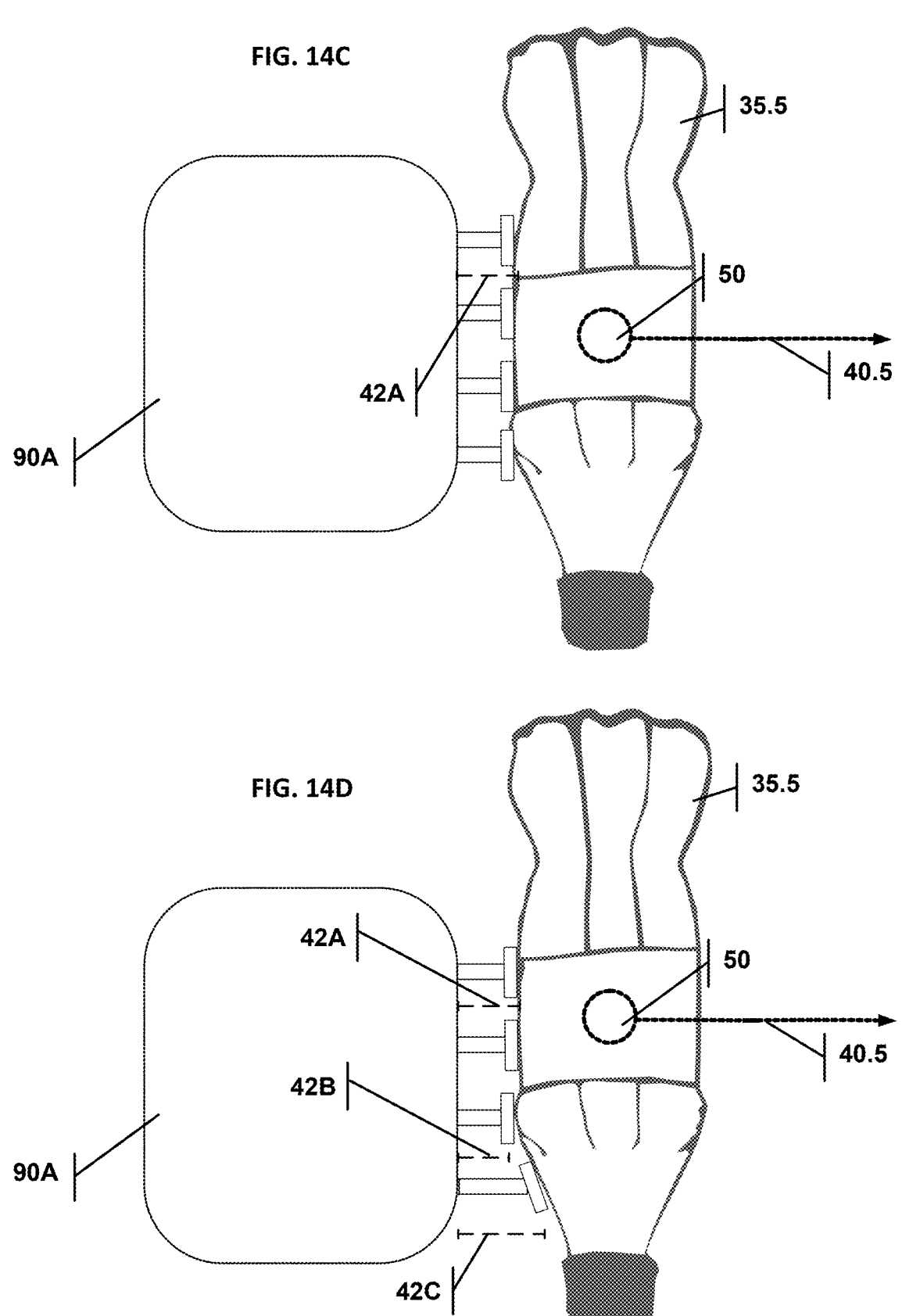
FIG. 14C illustrates a top view of a plurality of mechanical striker of the sorting system, in a parallelly arranged striker assembly, striking at the target object, resulting in the target object traveling in a linear manner.
FIG. 14D shows the top view of a parallelly arranged striker assembly wherein each mechanical striker can be operated independently, such that the striking distances are different.

In a sorter system 5 using mechanical strikers 90.1 to propel the target material 35.5 to the sort bin 25, the positions of the mechanical strikers 90.1 may be arranged parallel to one another in the mechanical striker assembly 90A, as illustrated in FIG. 14C. A parallel arrangement of a plurality of mechanical strikers 90.1 can minimize or eliminate unintended torque, improving the likelihood of a linear travel path of the target material 35.5 along its ejection path 40.5. The caveat of a parallel, rather than radial, arrangement for the positions of the mechanical strikers 90.1 is that, depending on the spacing between the individual mechanical strikers 90.1, a parallel arrangement is likely to result in a larger footprint of the mechanical striker assembly 90, potentially limiting maneuverability. While FIG. 14C shows a plurality of mechanical strikers 90.1 actuated the same striking distance 42A, FIG. 14D demonstrates that the mechanical strikers 90.1 can each have independent striking distances 42A, 42B, 42C. In FIG. 14D, the striking distance 42B is less than 42A, while the striking distance 42C is greater than 42A. The processor 70 can determine the force imparted by the mechanical striker 90.1 to a target material 35.5 based on one or more of: target material properties, expected target material size, expected target material shape, target material orientation, and/or target material positioning.

Figure 15:
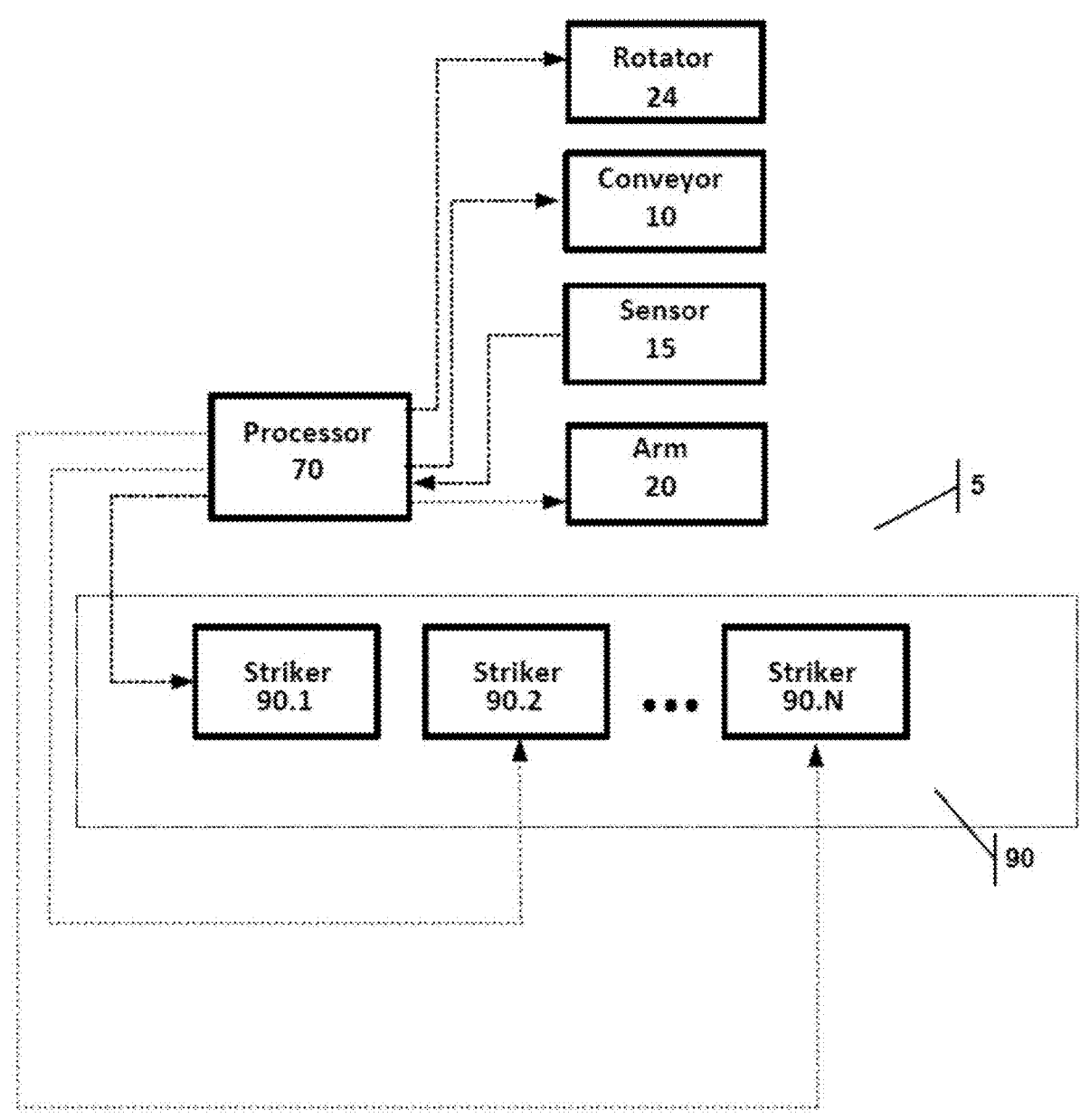
FIG. 15 is a schematic showing the various components of the sorting system with a mechanical striker assembly in place of a pneumatic assembly.

FIG. 15 presents a schematic of a sorter 5 embodiment of the present invention using mechanical means to push a target material into a sort bin. The processor 70 controls a conveyor 10, a sensor 15, a multi-axis arm 20 used to position the mechanical striker assembly 90, and a plurality of mechanical strikers 90.1, 90.2 . . . 90.N arranged either radially or in parallel to one another within the mechanical striker assembly 90. The processor 70 can control the mechanical strikers (90.1, 90.2 . . . 90.N) either independently, as illustrated in FIG. 15, or in tandem.

A mechanical sorter 5 for sorting a target material 35.5 from a stream of mixed materials 35, as provided by the present invention, comprises a conveyor 10, a sensor 15, a sort bin 25, a multi-axis arm 20, a striker assembly 90, and a processor 70. The conveyor 10 has a top surface 11 for transporting the mixed materials 35. The sensor comprises an inspection region 16 that includes a portion of the top surface 11 of the conveyor 10. The sort bin 25 is adjacent to the top surface 11. The multi-axis arm 20 is adjacent to the conveyor 10 and downstream from the sensor 15, and the arm 20 comprises a tool end 22 that can move over the top surface 11 of the conveyor 10. The striker assembly 90 comprises a plurality of mechanical strikers 90.1, and each mechanical striker 90.1 comprises a ferrous portion 91, a non-ferrous portion 92 attached to the ferrous portion 91, a spring 93 fixed to one end of the ferrous portion 91, and a linear actuator 94 positioned adjacent to another end of the ferrous portion 91. The processor 70 is connected to the sensor 15, the multi-axis arm 20, the striker assembly 90, and the plurality of mechanical strikers 90.1, wherein the processor performs the steps: a) determine the location of the target material 35.5; b) calculate an ejection path 40.5 from the target material 35.5 to the sort bin 25; c) position the striker assembly 90 adjacent to the target material 35.5 based on the ejection path 40.5; and d) actuate at least one linear actuator 94 to act upon the ferrous portion 91, moving the ferrous portion 91 and its attached non-ferrous portion 92, enabling the ferrous portion 91 to push the non-ferrous portion 92 so that the non-ferrous portion 92 extends outwardly and strikes the target material 35.5, thereby propelling the target material 35.5 along the ejection path 40.5 determined by the processor 70.

The positions of the mechanical strikers 90.1 can be arranged parallel to one another, seen in FIGS. 14C-14D, or can be arranged radially relative to an inner surface 95 of the striker assembly 90.

Each mechanical striker 90.1 can be restricted by a guide 97 extending between the inner surface 95 and the outer surface 96 of the striker assembly 90, as was discussed with reference to FIGS. 11A-11B. Each mechanical striker 90.1 may further comprise a striking surface 98 attached to the non-ferrous portion 92 opposite the end of the non-ferrous portion 92 that attaches to the ferrous portion 91 of the mechanical striker 90.1. The striker surface 98 may have a larger cross-sectional area compared to that of the non-ferrous portion 92 of the mechanical striker 90.1. The striker surface 98 may also be made of a flexible material that conforms to the shape of the target material 35.5 to make a larger area of physical contact and distribute the force imparted more evenly than a smaller area of contact can achieve.

The processor 70 of the sorter 5 may vary the force and/or the striking distance 42 of each mechanical striker 90.1 it controls, by varying the current and/or the length of time of actuation for each linear actuator 94. The processor 70 may actuate a plurality of linear actuators 94 to push a target material 35.5. The processor may also determine the force imparted by the mechanical striker 90.1 to a target material 35.5 and/or the striker distance 42 travelled by the mechanical striker 90.1 based upon one or more of: target material properties, expected target material size, expected target material shape, target material orientation, target material positioning, and combinations thereof.

The sorter 5 may further comprise a rotator 24 at the tool end 22 of the multi-axis arm 20 constructed to rotate the striker assembly 90, wherein the processor 70 is connected to the rotator 24 and is further programmed to actuate the rotator 24 based on the ejection path 40.5 calculated by the processor 70.

While this patent document contains many specifics, these should not be construed as limitations on the scope of any invention or of what may be claimed, but rather as descriptions of features that may be specific to embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

The invention claimed is:

1. A pneumatic sorter (5) for sorting a target material (35.1, 35.2, 35.3, 35.4) from a stream of mixed materials (35), the sorter (5) comprising:

a conveyor (10) with a top surface (11) for transporting the mixed material (35);

a sensor (15) comprising an inspection region (16) that includes a portion of the top surface (11);

a sort bin (25) adjacent to the top surface (11);

a multi-axis arm (20) adjacent to the conveyor (10) and downstream from the sensor (15), the multi-axis arm (20) comprising a tool end (22) that can move over the top surface (11);

a nozzle assembly (30) at the tool end (22), the nozzle assembly (30) comprising at least one nozzle (30.1);

an electro-mechanical valve (60.1) pneumatically connected to a pressurized air source (63) and to the at least one nozzle (30.1), and constructed to turn on and off the pressurized air to the at least one nozzle (30.1); and a processor (70) connected to the sensor (15), the multi-axis arm (20) and the electro-mechanical valve (60.1), the processor (70) is programmed to:

a. determine the location of the target material (35.1, 35.2, 35.3, 35.4);

b. calculate an ejection path (40.1, 40.2, 40.3, 40.4) from the target material (35.1, 35.2, 35.3, 35.4) to the sort bin (25);

c. position the multi-axis arm (20) such that the nozzle assembly (30) is adjacent to the target material (35.1, 35.2, 35.3, 35.4) and between a potentially blocking object on the top surface (11) and the target material (35.1, 35.2, 35.3, 35.4) based on the ejection path (40.1, 40.2, 40.3, 40.4); and d. actuate the electro-mechanical valve (60.1) to release pressurized air from the at least one nozzle (30.1) to propel the target material (35.1, 35.2, 35.3, 35.4) along the ejection path (40.1, 40.2, 40.3, 40.4) while the target material (35.1, 35.2, 35.3, 35.4) remains on the top surface (11) of the conveyor (10) without capturing the target material (35.1, 35.2, 35.3, 35.4).

2. The pneumatic sorter (5) of claim 1, wherein:

the nozzle assembly (30) comprises a suction nozzle (30.2) pneumatically connected to a vacuum air source (62);

the processor (70) is connected to the vacuum air source (62), and the processor (70) is further programmed to:

e. position the nozzle assembly (30) adjacent to the target material (35.1, 35.2, 35.3, 35.4);

f. actuate the vacuum air source (62) to form a suction connection between the suction nozzle (30.2) and the target material (35.1, 35.2, 35.3, 35.4);

g. position the multi-axis arm (20) such that the nozzle assembly (30) is over the sort bin (25); and h. de-actuate the vacuum air source (62) to release the suction connection.

3. The pneumatic sorter (5) of claim 2, wherein the vacuum air source (62) is a venturi powered by the pressurized air source (63).

4. The pneumatic sorter (5) of claim 2, wherein steps (e) through (h) are performed when the processor cannot calculate an unobstructed ejection path (40.1, 40.2, 40.3, 40.4) from the target material (35.1, 35.2, 35.3, 35.4) to the sort bin (25) in step (b).

5. The pneumatic sorter (5) of claim 1, further comprising:

a rotator (24) at the tool end (22) constructed to rotate the nozzle assembly (30);

wherein the processor (70) is connected to the rotator (24), and the processor (70) is further programmed to actuate the rotator (24) based on the ejection path (40.1, 40.2, 40.3, 40.4).

6. The pneumatic sorter (5) of claim 1, wherein:

the nozzle assembly (30) comprises a plurality of nozzles (30.1);

the electro-mechanical valve (60.1) further comprises a plurality of electro-mechanical valves (60.1, 60.2, 60.N) pneumatically connected to the plurality of nozzles (30.1);

the processor (70) is connected to the plurality of electro-mechanical valves (60.1, 60.2, 60.N), and the processor (70) is further programmed to actuate one or more of the plurality of electro-mechanical valves (60.1, 60.2, 60.N) to form a biased pressurized air stream based on the ejection path (40.1, 40.2, 40.3, 40.4).

7. The pneumatic sorter (5) of claim 1, wherein the sort bin (25) comprises at least two sort bins flanking the top surface (11).

8. The pneumatic sorter (5) of claim 1, wherein the conveyor (10) is connected to the processor (70), and the processor (70) can control the speed of the conveyor (10).

9. The pneumatic sorter (5) of claim 1, wherein the sensor (15) comprises a NIR sensor, a visual camera, a profiler, or combinations thereof.

* * * * *